US009349293B2

(12) United States Patent
Beaurepaire et al.

(10) Patent No.: US 9,349,293 B2
(45) Date of Patent: May 24, 2016

(54) METHOD AND APPARATUS FOR PROVIDING VEHICLE SYNCHRONIZATION TO FACILITATE A CROSSING

(71) Applicants: Jerome Beaurepaire, Berlin (DE); Philippe Beaurepaire, Tregomar (FR); Marko Tapio Tuukkanen, Schlenzer (DE)

(72) Inventors: Jerome Beaurepaire, Berlin (DE); Philippe Beaurepaire, Tregomar (FR); Marko Tapio Tuukkanen, Schlenzer (DE)

(73) Assignee: HERE GLOBAL B.V, Veldhoven (NL)

( * ) Notice: Subject to any disclaimer, the term of this patent is extended or adjusted under 35 U.S.C. 154(b) by 89 days.

(21) Appl. No.: 14/175,690

(22) Filed: Feb. 7, 2014

(65) Prior Publication Data

US 2015/0228195 A1    Aug. 13, 2015

(51) Int. Cl.
*G08G 1/095* (2006.01)
*G08G 1/16* (2006.01)
(Continued)

(52) U.S. Cl.
CPC *G08G 1/166* (2013.01); *B60Q 1/50* (2013.01); *G08G 1/005* (2013.01); *G08G 1/0962* (2013.01); *G08G 1/162* (2013.01); *G08G 1/163* (2013.01); *B60Q 2400/50* (2013.01)

(58) Field of Classification Search
CPC ......... G08G 1/01; G08G 1/096; G08G 1/167; B60Q 1/50; B60Q 1/005; E01F 9/065
USPC .............. 340/902, 905, 907, 944, 686.6, 436, 340/435, 539.23, 908; 701/1, 117, 36, 48, 701/301
See application file for complete search history.

(56) References Cited

U.S. PATENT DOCUMENTS 7,994,902 B2    8/2011  Avery et al.
2007/0102214 A1    5/2007  Wittorf et al.
(Continued)

FOREIGN PATENT DOCUMENTS

EP    2333742 A1    6/2011
EP    2543542 A1    1/2013
(Continued)

OTHER PUBLICATIONS

Borges et al., "Pedestrian Detection for Driver Assist ANS Autonomous Vehicle Operation Using Offboard and Onboard Sensing," Autonomous Systems Laboratory, CSIRO, Australia, retrieved from <http://www.araa.asn.au/acra/acra2010/papers/pap122s1-file1.pdf>, dated 2010, 7 pages.
(Continued)

*Primary Examiner* — Hoi Lau
(74) *Attorney, Agent, or Firm* — Ditthavong & Steiner, P.C.

(57) ABSTRACT

An approach is provided for determining at least one intention to perform at least one crossing of at least one object within proximity of at least one first vehicle. The approach involves determining at least one second vehicle within proximity of the at least one crossing, the at least one first vehicle, or a combination thereof. The approach further involves causing, at least in part, a signaling among at least one first device associated with the at least one first vehicle and at least one second device associated with the at least one second vehicle, wherein the signaling causes, at least in part, a synchronization of at least one movement, at least one stop, the at least one intention to perform the at least one crossing, or a combination thereof among the at least one first vehicle, the at least one second vehicle, at least one cloud service, or a combination thereof in response to the at least one request.

18 Claims, 22 Drawing Sheets

(51) Int. Cl.
*G08G 1/0962* (2006.01)
*B60Q 1/50* (2006.01)
*G08G 1/005* (2006.01)

(56) References Cited

U.S. PATENT DOCUMENTS

| | | | |
|---|---|---|---|
| 2010/0102991 A1* | 4/2010 | Hernandez Gonzalez et al. | 340/944 |
| 2010/0214085 A1 | 8/2010 | Avery et al. | |
| 2011/0071761 A1* | 3/2011 | Cummings | 701/301 |
| 2011/0140919 A1* | 6/2011 | Hara et al. | 340/907 |
| 2011/0196580 A1* | 8/2011 | Xu et al. | 701/48 |
| 2011/0210866 A1 | 9/2011 | David et al. | |
| 2011/0210867 A1* | 9/2011 | Benedikt | 340/905 |
| 2011/0246156 A1 | 10/2011 | Zecha et al. | |
| 2012/0182140 A1 | 7/2012 | Kumabe et al. | |
| 2012/0249341 A1* | 10/2012 | Brown et al. | 340/902 |
| 2013/0131893 A1* | 5/2013 | Nakao et al. | 701/1 |
| 2013/0179056 A1* | 7/2013 | Fukuyama | 701/117 |
| 2014/0267398 A1* | 9/2014 | Beckwith et al. | 345/633 |
| 2014/0324286 A1* | 10/2014 | Tsuchida | 701/36 |
| 2015/0078820 A1* | 3/2015 | Brown | 404/1 |

FOREIGN PATENT DOCUMENTS

| | | |
|---|---|---|
| JP | 2005332297 | 12/2005 |
| JP | 2007316772 | 12/2007 |
| JP | 2011076568 | 4/2011 |

OTHER PUBLICATIONS

Guangzhe, "Estimation of Pedestrian Walking Direction for Driver Assistance System," retrieved from <http://ir.nul.nagoya-u.ac.jp/jspui/bitstream/2237/17275/1/k9898.pdf> on Sep. 15, 2014, 116 pages.

Kumar et al., "A Cloud-Assisted Design for Automomous Driving," MIT CSAIL, retrieved from < http://homes.cs.washington.edu/~gshyam/Papers/carcel.pdf >, dated Aug. 17, 2012, 6 pages.

Bilstrup et al., "Vehicle Alert System", retrieved from http://www.diva-portal.org/smashiget/diva2:239391/FULLTEXT01, Sep. 4, 2013, 8 pages.

"Safety Tech Alerts Pedestrians to Oncoming Cars and Vice Versa [Video]", retrieved from http://www.psfk.com/2013/09/pedestrian-car-alerts.html, Publication Date: Sep. 4, 2013, 13 pages.

Notification of Transmittal of the International Search Report and the Written Opinion of the International Searching Authority, or the Declaration; Written Opinion of the International Searching Authority and International Search Report for corresponding International Application No. PCT/EP2015/051551, mailed May 6, 2015, 12 pages.

\* cited by examiner

METHOD AND APPARATUS FOR PROVIDING VEHICLE SYNCHRONIZATION TO FACILITATE A CROSSING

BACKGROUND

Service providers and device manufacturers (e.g., wireless, cellular, etc.) are continually challenged to deliver value and convenience to consumers by, for example, providing compelling network services. One area of development is related to navigation and mapping service to provide increased safety and situational awareness when traveling. For example, when a traveler (e.g., a pedestrian, a car, bicyclist, etc.) intends to make a crossing in front of oncoming traffic, communications among the parties (e.g., the crossing traveler and vehicles in the oncoming traffic) can be limited, thereby potentially creating safety concerns. Accordingly, service providers and device manufacturers face significant technical challenges to enabling coordination and synchronization among the parties ensure a safe crossing.

Some Example Embodiments

Therefore, there is a need for an approach for causing a synchronizing vehicle movement to coordinate a crossing within proximity of one or more vehicles.

According to one embodiment, a method comprises determining at least one intention to perform at least one crossing of at least one object within proximity of at least one first vehicle. The method also comprises determining at least one second vehicle within proximity of the at least one crossing, the at least one first vehicle, or a combination thereof. The method further comprises causing, at least in part, a signaling among at least one first device associated with the at least one first vehicle and at least one second device associated with the at least one second vehicle, wherein the signaling causes, at least in part, a synchronization of at least one movement, at least one stop, the at least one intention to perform the at least one crossing, or a combination thereof among the at least one first vehicle, the at least one second vehicle, at least one cloud service, or a combination thereof in response to the at least one request.

According to another embodiment, an apparatus comprises at least one processor, and at least one memory including computer program code for one or more computer programs, the at least one memory and the computer program code configured to, with the at least one processor, cause, at least in part, the apparatus to determine at least one intention to perform at least one crossing of at least one object within proximity of at least one first vehicle. The apparatus is also caused to determine at least one second vehicle within proximity of the at least one crossing, the at least one first vehicle, or a combination thereof. The apparatus is further caused to cause, at least in part, a signaling among at least one first device associated with the at least one first vehicle and at least one second device associated with the at least one second vehicle, wherein the signaling causes, at least in part, a synchronization of at least one movement, at least one stop, the at least one intention to perform the at least one crossing, or a combination thereof among the at least one first vehicle, the at least one second vehicle, at least one cloud service, or a combination thereof in response to the at least one request.

According to another embodiment, a computer-readable storage medium carries one or more sequences of one or more instructions which, when executed by one or more processors, cause, at least in part, an apparatus to determine at least one intention to perform at least one crossing of at least one object within proximity of at least one first vehicle. The apparatus is also caused to determining at least one second vehicle within proximity of the at least one crossing, the at least one first vehicle, or a combination thereof. The apparatus is further caused to cause, at least in part, a signaling among at least one first device associated with the at least one first vehicle and at least one second device associated with the at least one second vehicle, wherein the signaling causes, at least in part, a synchronization of at least one movement, at least one stop, the at least one intention to perform the at least one crossing or a combination thereof among the at least one first vehicle, the at least one second vehicle, at least one cloud service, or a combination thereof in response to the at least one request.

According to another embodiment, an apparatus comprises means for determining at least one intention to perform at least one crossing of at least one object within proximity of at least one first vehicle. The apparatus also comprises means for determining at least one second vehicle within proximity of the at least one crossing, the at least one first vehicle, or a combination thereof. The apparatus further comprises means for causing, at least in part, a signaling among at least one first device associated with the at least one first vehicle and at least one second device associated with the at least one second vehicle, wherein the signaling causes, at least in part, a synchronization of at least one movement, at least one stop, the at least one intention to perform the at least one crossing or a combination thereof among the at least one first vehicle, the at least one second vehicle, at least one cloud service, or a combination thereof in response to the at least one request.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing vehicle synchronization to facilitate a crossing are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
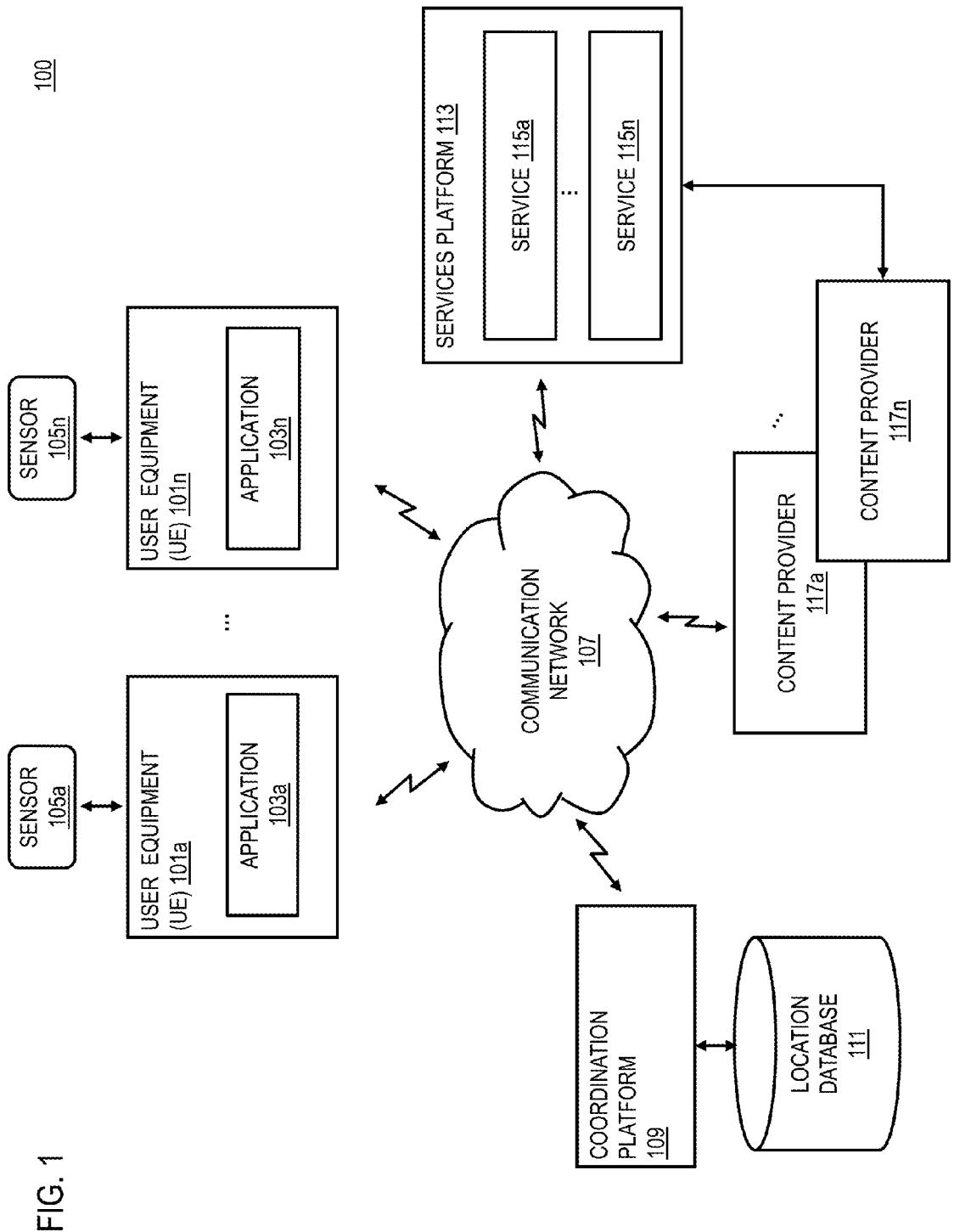
FIG. 1 is a diagram of a system capable of providing vehicle synchronization to facilitate a crossing, according to one embodiment.

FIG. 1 is a diagram of a system capable of providing vehicle synchronization to facilitate a crossing, according to one embodiment. As noted above, crossing in front of oncoming traffic can potentially create safety concerns. For example, in a pedestrian use case, it can be difficult for drivers to clearly indicate to pedestrians when the pedestrians can cross the street and when they cannot. This difficulty is further increased when multiple vehicles or drivers are present. For example, one driver may indicate to the pedestrians that they can cross but another driver may not have such intent or even of the presence of the pedestrians. Further, it can be challenging for pedestrians to know that a driver has seen them and has acknowledged that they can walk through the street and make a crossing. In addition, the pedestrians can never be sure whether or not they can cross the street with multiple lanes because the driver on one lane may be fine with letting the pedestrian cross the street but the drivers on the other lanes may not see the pedestrian and/or may not agree to let him walk through the street. At present, the solution for these problems is for the driver to either slow down and/or blink the headlights as an indication that the pedestrian may cross the street. However, these existing solutions are not clear, and can be misinterpreted.

To address this problem, a system 100 of FIG. 1 introduces the capability to provide vehicle synchronization to facilitate a crossing. As shown in FIG. 1, the system 100 comprises user equipment (UE) 101*a*-101*n* (collectively referred to as UE 101) that may include or be associated with applications 103*a*-103*n* (collectively referred to as applications 103) and sensors 105*a*-105*n* (collectively referred to as sensors 105). In one embodiment, the UE 101 has connectivity to a coordination platform 109 via the communication network 107, whereby the coordination platform 109 performs one or more functions associated with providing vehicle synchronization to facilitate a crossing.

In one example embodiment, synchronization between one or more vehicles is especially useful in the context of vehicles being autonomous, for example, at least one vehicle needs to communicate with other vehicles when some pedestrians are crossing a street to prevent a critical situation wherein the at least one vehicle lets the pedestrian cross and the other vehicles does not. In one scenario, the intelligent road network, and the vehicle to vehicle connectivity is planned to be used with autonomous driving, where a vehicle may share their location information with other vehicles, and the network, to allow optimization of traffic and reduce collisions between vehicles. However, one of the deficiencies of the existing concepts has been overlooking objects which are not yet visible in the line of sight. At present, the one or more sensors associated with the at least one vehicle can detect objects which are in the line of sight. On the other hand, the cloud service is available only to vehicles and road infrastructure that are connected to it. In addition, the existing concepts does not detect the potential intention of the pedestrian to move around or estimate the location of pedestrian when the at least one vehicle is in near distance of the pedestrian.

To address this problem, the coordination platform 109 proposes a method of using the information of one or more UE 101 and/or one or more sensors associated with at least one vehicle to improve the safety of autonomous driving. In one scenario, at least one vehicle may update the location of at least one pedestrian to the cloud service, and then the cloud service may share the location information of the pedestrian with other nearby vehicles. In another scenario, the coordination platform 109 may estimate the possible location of the at least one pedestrian when the at least one vehicle is approaching the pedestrian. The coordination platform 109 may detect the type of movement of the at least one pedestrian, the location of the at least one pedestrian, or a combination thereof. Then, the coordination platform 109 may determine an average speed for the at least one pedestrian when walking or running. The coordination platform 109 may cause a configuration of a certain radius around the location where the at least one pedestrian was detected. The type of movement of the at least one pedestrian can impact the length of the radius. Subsequently, when other vehicles are approaching the boundaries of the radius, the coordination platform 109 may notify the other vehicles and may synchronize their movement, for example, the other vehicles may slow down or prepare for an activity. By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or WiFi connection either through the inbuilt communication equipment or from the UE 101 associated with the vehicles. The applications 103 may assist in conveying sensor information via the communication network 107.

By way of example, the applications 103 may be any type of application that is executable at the UE 101, such as content provisioning services, location-based service applications, navigation applications, camera/imaging application, media player applications, social networking applications, calendar applications, and the like. In one embodiment, one of the applications 103 at the UE 101 may act as a client for the coordination platform 109 and perform one or more functions associated with the functions of the coordination platform 109 by interacting with the coordination platform 109 over the communication network 107.

By way of example, the sensors 105 may be any type of sensor. In certain embodiments, the sensors 105 may include, for example, a global positioning sensor for gathering location data, a network detection sensor for detecting wireless signals or network data, temporal information, a camera/imaging sensor for gathering image data, an audio recorder for gathering audio data, and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, Li-Fi, near field communication etc.). It is contemplated that the sensors 105 includes one or more components for determining the position of the at least one pedestrian, the at least one vehicle, or a combination thereof. In one embodiment, the sensors 105 may detect the location information of a pedestrian and may transmit the information through the communication module 203. The sensors 105 may receive instructions from the coordination platform 109 to carry out procedures such as synchronization of at least one movement, synchronization of at least one stop, location status reporting and so on. In one scenario, the sensors may provide proximity information between the at least one vehicle and the at least one pedestrian.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the coordination platform 109 may be a platform with multiple interconnected components. The coordination platform 109 may include multiple servers, intelligent networking devices, computing devices, components and corresponding software for providing vehicle synchronization to facilitate a crossing. In addition, it is noted that the coordination platform 109 may be a separate entity of the system 100, a part of the one or more services 115 of the service platform 113, or included within the UE 101 (e.g., as part of the applications 103).

In one embodiment, the coordination platform 109 determines at least one intention to perform at least one crossing of at least one object within proximity of at least one first vehicle. In one embodiment, a request may be sent to the coordination platform 109 for any type of potential crossing, for instance, a driver is backing his vehicle from a garage and cannot see the travel lane, whereby the vehicle or the UE 101 of the driver may send a request to the coordination platform 109 to coordinate with other vehicles on the street and allow for safe crossing. In another embodiment, a pedestrian is trying to cross a street that does not have a traffic light, it is difficult for the pedestrian to comprehend whether the driver has seen him and has acknowledged that he can cross the street. Then, the UE 101 of the pedestrian may send a request to the coordination platform 109 to allow the pedestrian to safely walk through the street by synchronizing the communication with the at least one vehicle and giving feedback to pedestrian. In one scenario, the coordination platform 109 may synchronize the request of one or more pedestrian, for example, the higher the number of the pedestrian, the stronger is their request for allowing them to cross the street. The coordination platform 109 may harmonize the requests of the multiple pedestrians and may send a request to the at least one vehicle for efficiency.

In one embodiment, the coordination platform 109 may further determine at least one second vehicle within proximity of the at least one crossing and/or the at least one first vehicle. In one scenario, it is difficult for a user to cross a road with multiple lanes because one driver may be fine with letting the pedestrian cross the lane, however another driver on the other lane may either not see the pedestrian or does not agree to let him walk through the lane. Consequently, the UE 101 of the pedestrian may send a request to the coordination platform 109 to synchronize communication across multiple vehicles in different lanes to indicate the pedestrian that he can safely cross the street. Subsequently, the coordination platform 109 causes, at least in part, a signaling among at least one first device associated with the at least one first vehicle and at least one second device associated with the at least one second vehicle, wherein the signaling causes, at least in part, a synchronization of at least one movement, at least one stop, the at least one intention to perform the at least one crossing, or a combination thereof among the at least one first vehicle, the at least one second vehicle, at least one cloud service, or a combination thereof in response to the at least one request.

In one embodiment, the coordination platform 109 may cause an update of the location information, the radius, the direction of the movement, or a combination thereof, associated with the at least one pedestrian based, at least in part, on the information provided by the at least one vehicle that passes by the at least one pedestrian. Then, the updated information is provided to the cloud for further analysis. Consequently, the other vehicles receives an up-to-date information of the pedestrian location, the type of movement, and the direction of the movement based on the data from the at least one vehicle that recently passed by the at least one pedestrian. In another example embodiment, the coordination platform 109 may provide data information to the one or more vehicles with a request to monitor the one or more pedestrians and report the updated information to the coordination platform 109, if any. In one scenario, when other vehicles passes by the at least one pedestrian, the location information, the radius, the direction of movement, or a combination thereof for the at least one pedestrian is again updated to the cloud for further analysis.

In one embodiment, the coordination platform 109 may cause one or more vehicles passing by and detecting the at least one pedestrian to verify the location information for the at least one pedestrian. In such manner, the coordination platform 109 causes configuration of accurate radius and future location for the at least one pedestrian. By this means, the coordination platform 109 ensures that one or more autonomous vehicles have adequate information regarding any potential objects in the front. In one scenario, the coordination platform 109 may warn the one or more connected vehicles and/or autonomous vehicles of any potential pedestrian crossings based, at least in part, on the location information provided by the at least one UE 101 associated with the at least one vehicle.

As discussed, the UE 101 may utilize location-based technologies (sensors, GPS receivers, etc.) to determine location and temporal information regarding the UE 101. For instance, the UE 101 may use sensors to obtain information on the proximity, orientations, etc. for the one or more vehicles and/or one or more pedestrian. In one embodiment, the coordination platform 109 may create the location database 111 wherein the one or more proximity information, orientation information may be stored. In another embodiment, the coordination platform 109 may receive content information from various sources, for example, third-party content providers, various databases, etc. and may store the received information on the location database 111. The location database 111 may include identifiers to the UE 101 as well as associated information. Further, the information may be any multiple types of information that can provide means for aiding in the content provisioning process.

The services platform 113 may include any type of service. By way of example, the services platform 113 may include mapping services, navigation services, travel planning services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the coordination platform 109 and the content providers 117 to supplement or aid in the processing of the content information.

By way of example, the services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability. The services 115 may additionally assist in providing the coordination platform 109 with travel information for the one or more vehicles and/or one or more pedestrians.

The content providers 117 may provide content to the UE 101, the coordination platform 109, and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid in determining the willingness to yield between vehicles. In one embodiment, the content providers 117 may also store content associated with the UE 101, the coordination platform 109, and the services 115 of the services platform 113. In another embodiment, the content providers 117 may manage access to a central repository of data, and offer a consistent, standard interface to data, such as a repository of users' navigational data content.

By way of example, the UE 101, the coordination platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
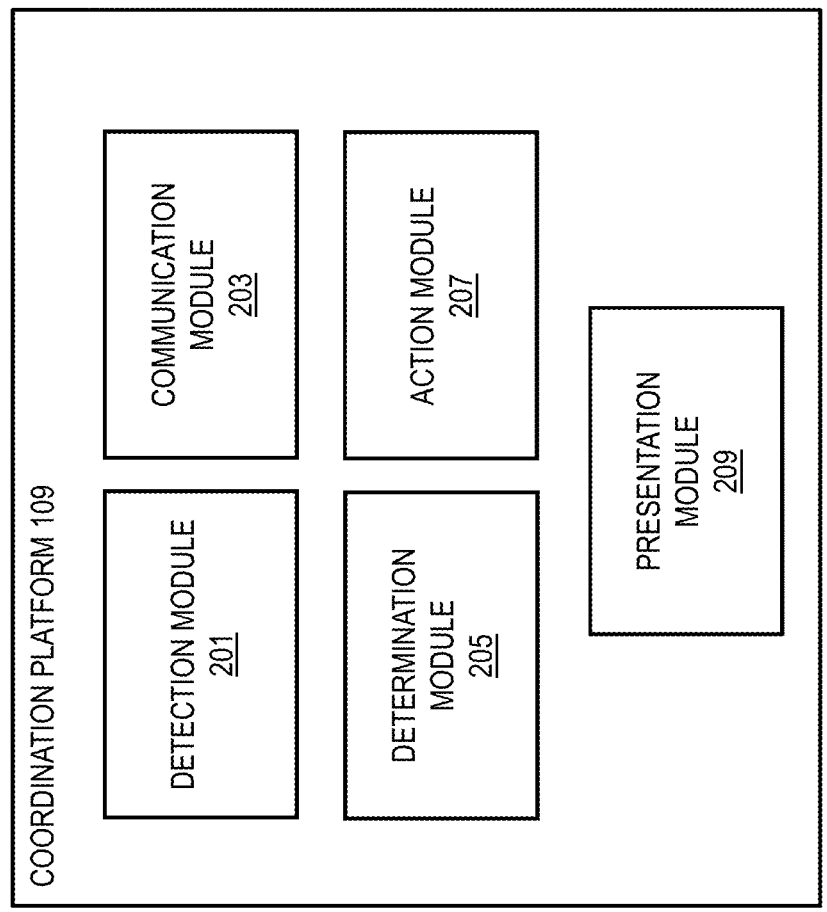
FIG. 2 is a diagram of the components of the coordination platform 109, according to one embodiment.

FIG. 2 is a diagram of the components of the coordination platform 109, according to one embodiment. By way of example, the coordination platform 109 includes one or more components for providing vehicle synchronization to facilitate a crossing. It is contemplated that the functions of these components may be combined in one or more components or performed by other components of equivalent functionality. In this embodiment, the coordination platform 109 includes a detection module 201, a communication module 203, a determination module 205 and a presentation module 209.

In one embodiment, the detection module 201 may detect a sensor-based input, wherein the detection module 201 may detect the presence of the at least one pedestrian and/or the at least one other vehicle and/or any other type of traveler (biker, etc.) that wants to cross the street. Subsequently, the detection module 201 may calculate the location information for the at least one pedestrian and/or the at least one other vehicle and/or any other type of traveler (biker, etc.) that wants to cross the street, in order to determine their proximity from the at least one vehicle within a close proximity from the at least one crossing. In another embodiment, the detection module 201 may also detect a gesture-based input, whereby the detection module 201 may detect pre-stored action patterns, for example, a gesture (an action) of raising a hand, pointing of a UE 101, in addition to the relative position information. In a further embodiment, the detection module 201 may detect the type of movement of the at least one pedestrian.

In one embodiment, the communication module 203 enables formation of a session over a communication network 107 by implementing various protocols and data sharing techniques for enabling collaborative execution between the coordination platform 109 and the at least one UE 101. In another embodiment, the communication module 203 establishes a communication session between the at least one vehicle detected within a close proximity of a crossing, and the at least one pedestrian and/or the at least one other vehicle and/or any other type of traveler (biker, etc.) that wants to cross the street. In another embodiment, the communication module 203 establishes inter-vehicle communication between the one or more vehicles detected within close proximity to the at least one crossing, whereby the location information of the at least one pedestrian and/or the at least one other vehicle and/or any other type of traveler (biker, etc.) that wants to cross the street is communicated to the one or more vehicles. In a further embodiment, at least one vehicle may update the location information for the at least one pedestrian to the cloud service via the communication module 203, whereby the cloud service may share the location information of the at least one pedestrian with other vehicles.

In one embodiment, the determination module 205 may receive at least one request to perform at least one crossing within proximity of the at least one vehicle via the communication module 203. The determination module 205 may process the request and may determine whether the at least one vehicle can stop safely based, at least in part, on the proximity of the at least one pedestrian, the speed of the at least one vehicle, or a combination thereof. In another embodiment, the determination module 205 may take into consideration the attributes of the requestor making the crossing, for example, at least one other vehicle or a biker is more likely to cross the street faster than a pedestrian. Subsequently, the determination module 205, may determine that the at least one vehicle may be safely stopped, whereby determination module 205 informs the action module 207 to stop the vehicle. In another embodiment, the determination module 205 may determine the average speed of the at least one pedestrian based, at least in part, on the speed of the movement detected by the detection module 201. In a further embodiment, the determination module may estimate the possible location for the at least one pedestrian based, at least in part, on the determined average speed, the direction of the movement, or a combination thereof.

In one embodiment, the action module 207 may cause the at least one vehicle to stop based, at least in part, on a determination that the at least one vehicle can be safely stopped and the at least one pedestrian can safely cross the street. In another embodiment, one or more sensors may determine the presence of other vehicles proximate to the crossing, whereupon the coordination platform 109 may cause a synchronization of the at least one movement, at least one stop, or a combination thereof. In such scenario, the action module 207 confirms that all the vehicles are stationary before conveying the message to the presentation module 209 to inform the at least one pedestrian that he can safely cross the road. In a further embodiment, the action module 207 may cause a configuration of a certain radius around the location of the at least one pedestrian based, at least in part, on the location information provided by the detection module 201.

In one embodiment, the presentation module 209 obtains a set of summary statistics from the other modules. Then, the presentation module 209 continues with generating a presentation corresponding to the request of the at least one user. In one embodiment, the presentation module 209 may cause a presentation of colored lights for indicating the at least one pedestrian that a crossing can be safely performed. In another embodiment, the presentation module 209 may cause a projection of a crossing symbol on the at least one crossing path indicating the at least one pedestrian that he can safely cross the street. In a further embodiment, the presentation module 209 may cause a presentation corresponding to the request in the at least one UE 101 of the at least one pedestrian, for example, the UE 101 of the at least one pedestrian may vibrate, or receive a text message, or receive images, as an indication that it is safe to cross the street.

The above presented modules and components of the coordination platform 109 can be implemented in hardware, firmware, software, or a combination thereof. Though depicted as a separate entity in FIG. 1, it is contemplated that the coordination platform 109 may be implemented for direct operation by respective UE 101. As such, the coordination platform 109 may generate direct signal inputs by way of the operating system of the UE 101 for interacting with the applications 103. In another embodiment, one or more of the modules 201-209 may be implemented for operation by respective UEs, as a coordination platform 109, or combination thereof. Still further, the coordination platform 109 may be integrated for direct operation with the services 115, such as in the form of a widget or applet, in accordance with an information and/or subscriber sharing arrangement. The various executions presented herein contemplate any and all arrangements and models.

Figure 3:
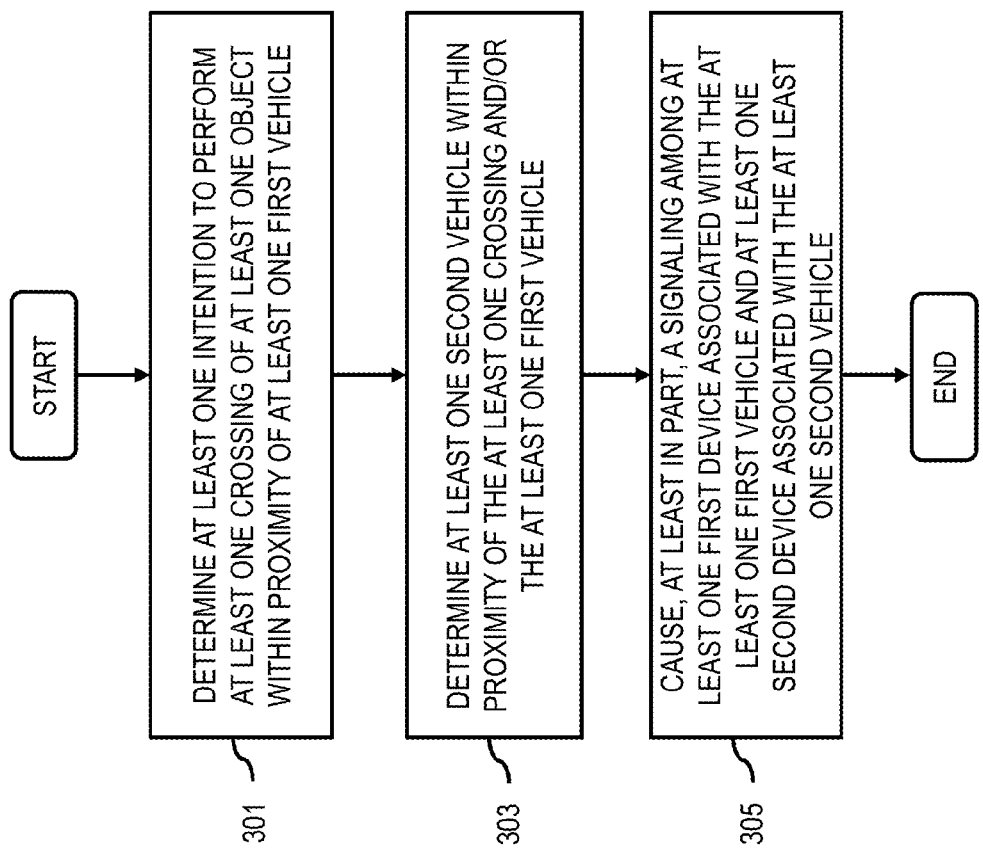
FIG. 3 is a flowchart of a process for causing a signaling among the device associated with one or more vehicles based, at least in part, on a request to perform at least one crossing of at least one object within the proximity of one or more vehicles, according to one embodiment.
Figure 14:
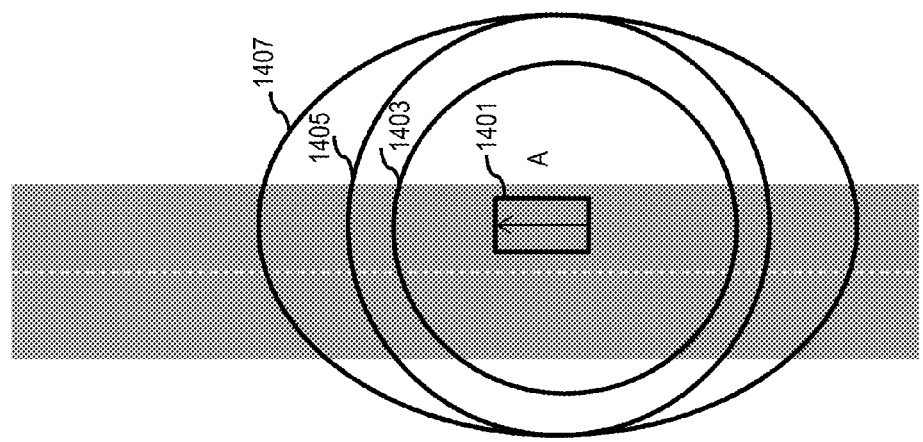
FIG. 14 is a user interface diagram that represents a scenario wherein the at least one vehicle is equipped with numerous sensors to detect one or more objects in the surrounding, according to one example embodiment.

FIG. 3 is a flowchart of a process for causing a signaling among the device associated with one or more vehicles based, at least in part, on a request to perform at least one crossing of at least one object within the proximity of one or more vehicles, according to one embodiment. In one embodiment, the coordination platform 109 performs the process 300 and is implemented in, for instance, a chip set including a processor and a memory as shown in FIG. 14.

In step 301, the coordination platform 109 determines at least one intention to perform at least one crossing of at least one object within proximity of at least one first vehicle. In one scenario, the requestor making the crossing can be a pedestrian, other vehicle, or any other type of traveler (bikers, etc.) that wants to make a crossing. In another scenario, a crossing can be any type of crossing, for example, crossing of a street that does not have a traffic light. In one example embodiment, a UE 101 of the at least one pedestrian and/or the sensors of the one or more proximate vehicles may determine the position, direction and speed of the pedestrian and surrounding vehicles. Then, the coordination platform 109 determines the request to allow a pedestrian to safely cross the street by synchronizing the communication across multiple vehicles and giving feedback to pedestrian. In one example embodiment, the at least one object may be a communication device sending signals to the at least one first vehicle and the one or more second vehicles, or a passive individual, animal, bike, vehicle, etc. without any signaling. In another example embodiment, an intention may include receiving an active request from a signaling device, or a detection of passive individual, animal, bike, vehicle, etc. on the side of the at least one road.

In step 303, the coordination platform 109 determines at least one second vehicle within proximity of the at least one crossing, the at least one first vehicle, or a combination thereof. In one embodiment, a pedestrian cannot be sure on when to cross a road with multiple lanes because the drivers of the vehicles on different lanes may not agree on allowing the pedestrian to cross the street. In one scenario, the drivers of the vehicles on different lanes may not see the pedestrian and/or may be too close from the crossing to stop. As a result, the coordination platform 109 may determine one or more other proximate vehicles from the crossing and/or from the at least one detected first vehicle to notify them about the presence of the at least one pedestrian. The notification may include location information, attribute information of the at least one pedestrian, a request to monitor the at least one pedestrian and report back, or a combination thereof. In one scenario, at least one vehicle updates the coordination platform 109 with regards to the location information for the at least one pedestrian, whereby the coordination platform 109 may share the location information of the at least one pedestrian with the other nearby vehicles.

In step 305, the coordination platform 109 causes, at least in part, a signaling among at least one first device associated with the at least one first vehicle and at least one second device associated with the at least one second vehicle, wherein the signaling causes, at least in part, a synchronization of at least one movement, at least one stop, the at least one intention to perform the at least one crossing, or a combination thereof among the at least one first vehicle, the at least one second vehicle, at least one cloud service, or a combination thereof in response to the at least one request. In one embodiment, to enhance pedestrian safety near roadways the UE 101 of the at least one pedestrian and the one or more vehicles may communicate via dedicated short range communication (DSRC). In one scenario, the at least one pedestrian may be in the direct line of sight of the at least one vehicle, and the proximity and the trajectory of the pedestrian falls within the determined scope. Then, the coordination platform 109 initiates a communication between the devices associated with the one or more vehicles in different lanes for causing a synchronization of one or more movements, for example, the coordination platform 109 may cause the one or more vehicles in different lanes to stop based, at least in part, on a determination that it is possible for the vehicles in different lanes to stop safely. In one scenario, the coordination platform 109 may estimate a potential location for the at least one pedestrian by detecting the type of movement the at least one pedestrian has at the time when the at least one vehicle is approaching nearby the at least one pedestrian. Further, the coordination platform 109 may determine an average speed for the at least one pedestrian and may generate a radius around the location area where the at least one pedestrian was detected. Then, the coordination platform 109 may cause a synchronization of movements between one or more vehicles detected within the boundaries of the radius. In another scenario, the location information for the at least one pedestrian may be updated whenever at least one vehicle passes by the pedestrian. The at least one vehicle may provide updated location information to the coordination platform 109 for further analysis, wherein the location information may comprise of pedestrian's pace, the direction of pedestrian's movement, or a combination thereof. Such updated location information is subject to verification by other vehicles passing by the at least one pedestrian. Subsequently, the coordination platform 109 may cause a synchronization of movements between one or more vehicles based, at least in part, on the updated location information for the at least one pedestrian.

Figure 4:
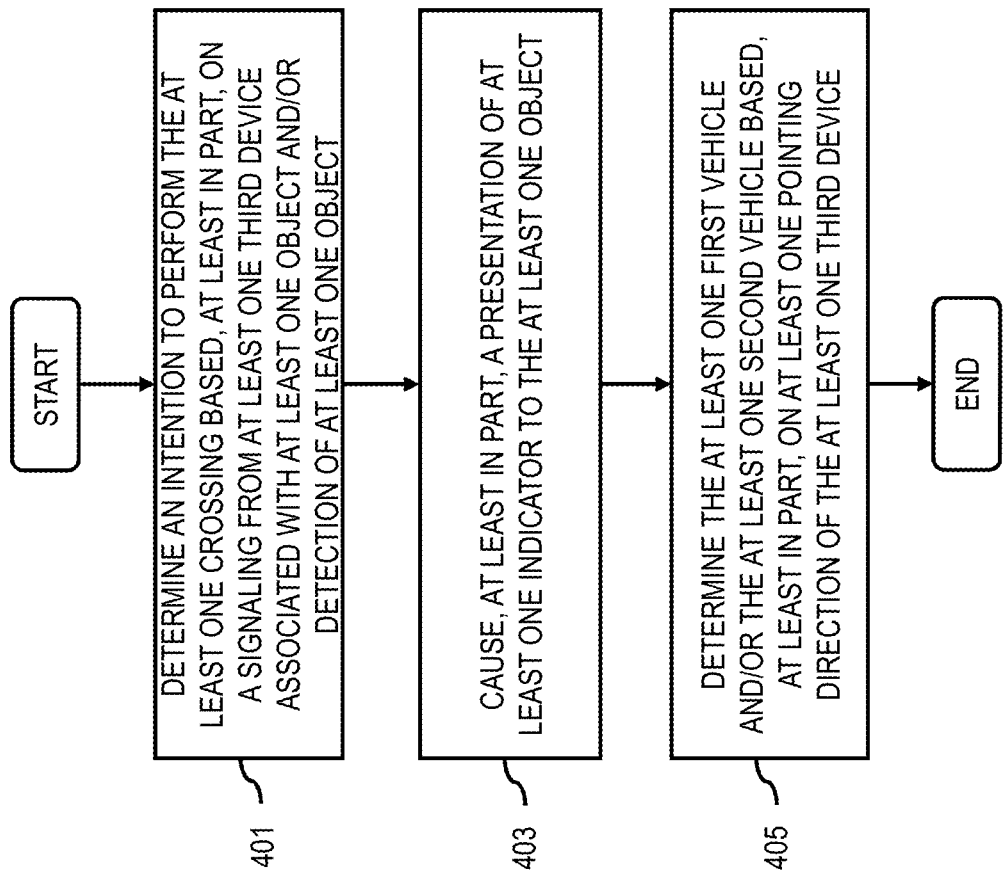
FIG. 4 is a flowchart of a process for causing, a presentation of at least one indicator to the at least one requestor for a request to perform at least one crossing, according to one embodiment.

FIG. 4 is a flowchart of a process for causing, a presentation of at least one indicator to the at least one requestor for a request to perform at least one crossing, according to one embodiment. In one embodiment, the coordination platform 109 performs the process 400 and is implemented in, for instance, a chip set including a processor and a memory as shown in FIG. 14.

In step 401, the coordination platform 109 determines the at least one intention to perform the at least one crossing based, at least in part, on a signaling from at least one third device associated with at least one object, a detection of the at least one object, or a combination thereof. In one scenario, a request to perform at least one crossing can be made by the at least one pedestrian via his UE 101 to the at least one vehicle within close proximity from the at least one pedestrian or a crossing. In another scenario, the one or more sensors of the at least one vehicle may detect the at least one pedestrian and may initiate communication with the UE 101 of the at least one pedestrian regarding the at least one crossing. In one example embodiment, the at least one object may be a communication device sending signals to the at least one first vehicle and the one or more second vehicles, or a passive individual, animal, bike, vehicle, etc. without any signaling.

In step 403, the coordination platform 109 causes, at least in part, a presentation of at least one indicator to the at least one object. In one embodiment, the at least one indicator signals to the at least one object that the at least one crossing can or cannot be performed based, at least in part, on the synchronization of at least one movement, the at least one stop, or a combination thereof. In another embodiment, the at least one indicator includes, at least in part, at least one crossing symbol projected by the at least one first vehicle, the at least one second vehicle, or a combination thereof. The at least one crossing symbol is projected on to at least one crossing path to be used for that at least one crossing. In a further embodiment, the at least one indicator includes, at least in part, a first colored light for indicating that the at least one crossing can be performed, a second colored light for indicating that the at least one crossing cannot be performed, or a combination thereof. In one scenario, the at least one vehicle approaches the intersection of a road at a normal speed, and the pedestrian is walking towards the intersection. The UE 101 of the at least one pedestrian may send a request to the at least one vehicle, whereby the coordination platform 109 determines the possibility to stop the vehicle safely based, at least in part, on the proximity information. The proximity information may comprise of proximity between the at least one vehicle and the crossing, the at least pedestrian and the crossing, the at least one vehicle and the at least one pedestrian, or a combination thereof. The coordination platform 109 further communicates the request to the other neighboring vehicles in other lanes. Then, the coordination platform 109 notifies the at least one pedestrian by synchronizing the intention of the one or more drivers in the other lanes. The notification to the at least one pedestrian may be a projection of a crossing symbol throughout the street by the vehicles in different lanes, indicating the at least one pedestrian that he may safely cross the street. In another embodiment, the headlights of the one or more vehicles in different lanes may project green light indicating that the pedestrian may walk through the crossing, whereas if the vehicle projects red light then it indicates that the vehicles are not stopping and the pedestrian may not cross the street.

In step 405, the coordination platform 109 determines the at least one first vehicle, the at least one second vehicle, or a combination thereof based, at least in part, on at least one pointing direction of the at least one third device. In one example embodiment, the at least one pedestrian may point his UE 101 to the at least one vehicle within specified proximity of the pedestrian and/or the crossing, whereby the UE 101 of the at least one pedestrian may send a request to the at least one vehicle for the at least one crossing. The pointed vehicle may be the first vehicle, and may detect any other vehicles in the neighboring lanes, whereby the coordination platform 109 may coordinate the intention of the one or more drivers. Subsequently, the coordination platform 109 may cause synchronization in the movement of the one or more vehicles in different lanes. In another example embodiment, the response of the one or more vehicles may be correlated with the traffic light and/or the ongoing road traffic. In one scenario, if the traffic light is red, it is an indication for the pedestrian that they can cross the street as all the vehicles are immobile. In another scenario, if there is traffic congestion, wherein vehicles are either fully stopped for periods of time or are moving few feet at a moment. In such situation, the coordination platform 109 may coordinate the movement with the one or more vehicles and may allow the at least one pedestrian to cross the street.

Figure 5:
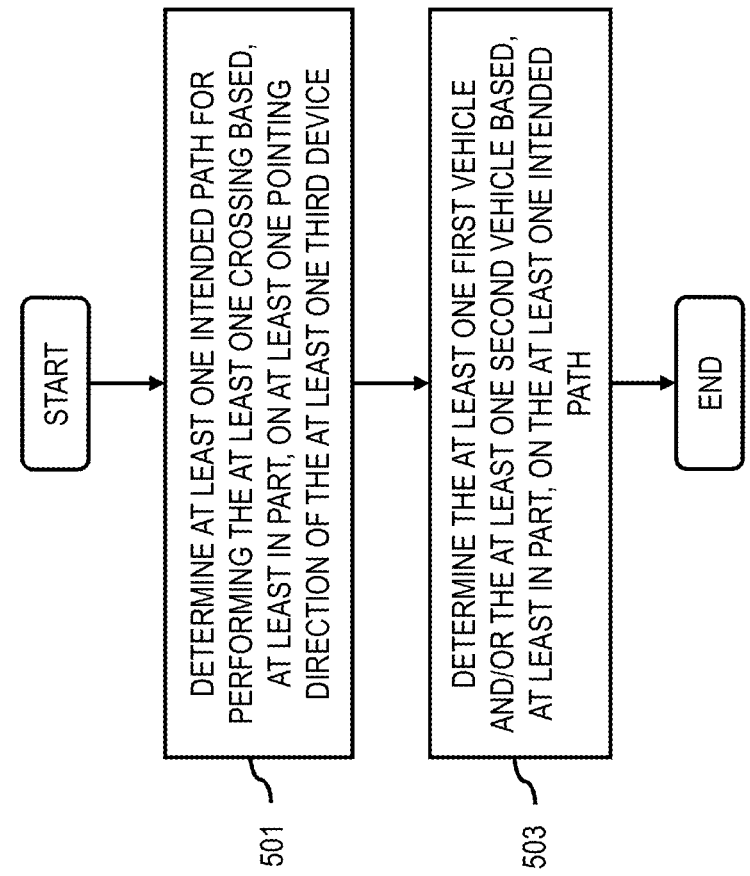
FIG. 5 is a flowchart of a process for determining one or more vehicles based, at least in part, on the requested path for performing the at least one crossing, according to one embodiment.

FIG. 5 is a flowchart of a process for determining one or more vehicles based, at least in part, on the requested path for performing the at least one crossing, according to one embodiment. In one embodiment, the coordination platform 109 performs the process 500 and is implemented in, for instance, a chip set including a processor and a memory as shown in FIG. 14.

In step 501, the coordination platform 109 determines at least one intended path for performing the at least one crossing based, at least in part, on at least one pointing direction of the at least one third device. In one example embodiment, the at least one pedestrian may be standing in between several crosswalks, whereby the pedestrian may point his UE 101 in the direction of his crossing, whereby the coordination platform 109 may determine the path for performing the at least one crossing. Accordingly, the coordination platform 109 may initiate communication between the one or more vehicles in the determined path and may synchronize their movement.

In step 503, the coordination platform 109 determines the at least one first vehicle, the at least one second vehicle, or a combination thereof based, at least in part, on the at least one intended path. In one example embodiment, the coordination platform 109 may determine one or more vehicles in the intended path based, at least in part, on the pointing direction of the at least one UE 101 of the at least one pedestrian. Then, the coordination platform 109 causes the vehicles in the determined path to communicate with each other when at least one pedestrian is crossing, in order to avoid the critical scenario in which the vehicle on one lane lets the pedestrian cross and the vehicles on the other lane does not.

Figure 6:
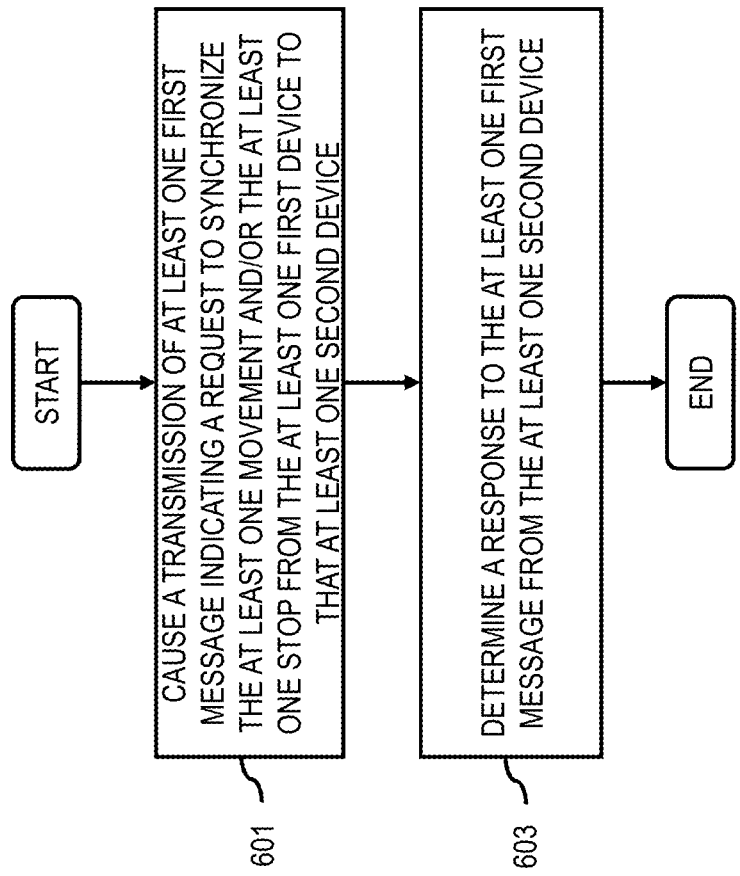
FIG. 6 is a flowchart of a process for synchronizing the at least one movement and/or the at least one stop between the at least one first vehicle and the at least one second vehicle, according to one embodiment.

FIG. 6 is a flowchart of a process for synchronizing the at least one movement and/or the at least one stop between the at least one first vehicle and the at least one second vehicle, according to one embodiment. In one embodiment, the coordination platform 109 performs the process 600 and is implemented in, for instance, a chip set including a processor and a memory as shown in FIG. 14.

In step 601, the coordination platform 109 causes, at least in part, a transmission of at least one first message indicating a request to synchronize the at least one movement, the at least one stop, or a combination thereof from the at least one first device to that at least one second device. In one example embodiment, a driver is backing his vehicle from the parking lot to a busy street, and the backing vehicle is obstructed from the view of the other drivers in the street because it is behind two other parked vehicles. In this scenario, the backing vehicle sends a request for at least one crossing to the one or more vehicles on the street, whereby the coordination platform 109 synchronizes the movement between the one or more vehicles for at least one safe crossing of the at least one parked vehicle.

In step 603, the coordination platform 109 determines a response to the at least one first message from the at least one second device, wherein the synchronization is based, at least in part, on the response. In one embodiment, the coordination platform 109 may analyze the intentions of the one or more drivers of the vehicles in different lanes to cause a synchronization of any sorts. In one scenario, the at least one pedestrian making a crossing sends a request via his UE 101 to the first vehicle, whereby the sensors of the first vehicle may detect other vehicles in different lanes. Subsequently, the coordination platform 109 causes a transmission of the request to the other vehicles in different lanes to determine the intention of their respective drivers. In case, the at least one other driver refuses to let the pedestrian cross the street, the coordination platform 109 may convey this response to the first vehicle. Subsequently, the first vehicle may indicate the pedestrian that it is not safe to cross the street, for example, by projecting a red light. In another embodiment, the consensus of the detected vehicles is a prerequisite for indicating the pedestrian to safely walk through the street. The coordination platform 109 cannot cause a synchronized movement between the vehicles unless the response from the at least one second device associated with the at least one second vehicle is positive.

Figure 7:
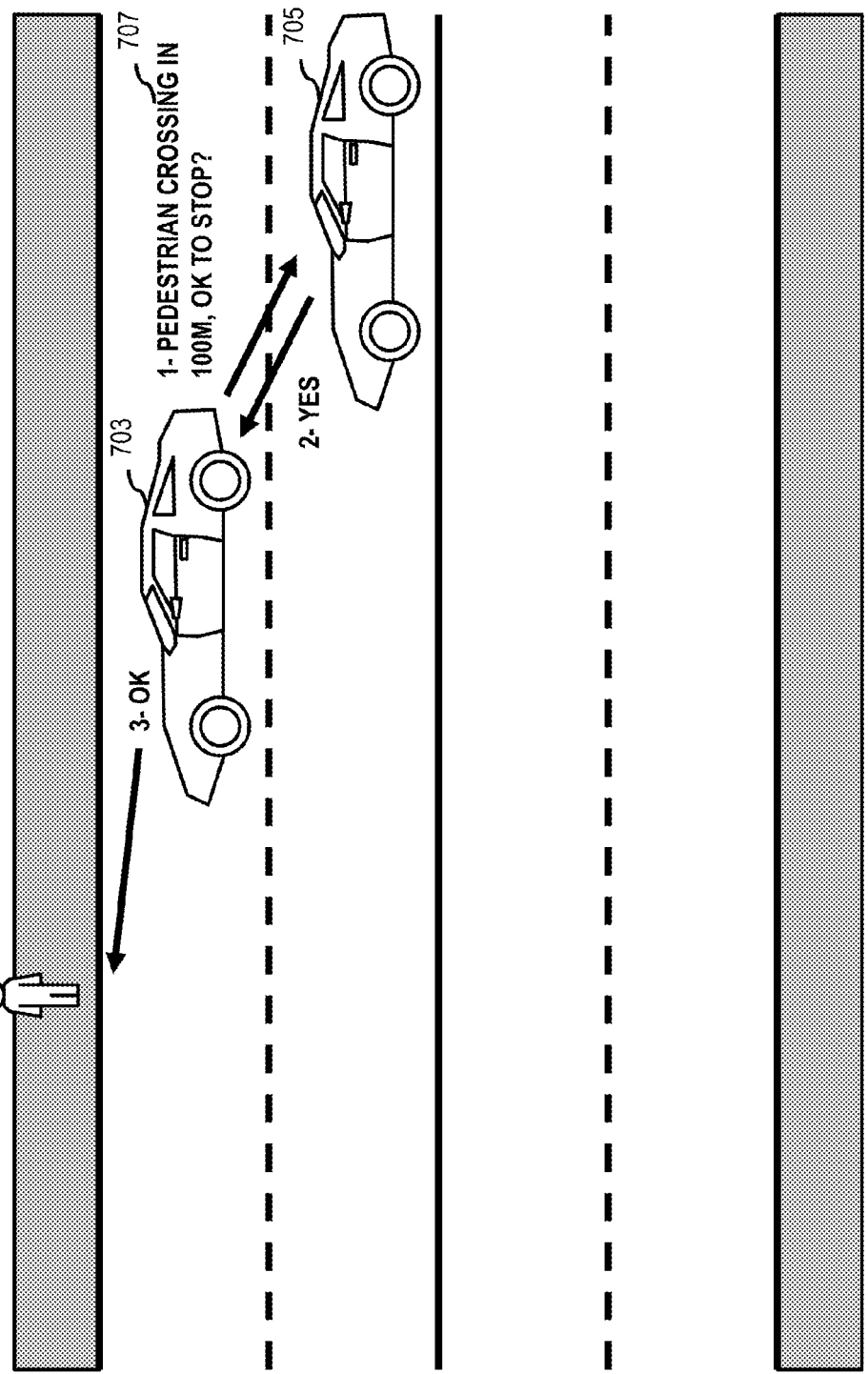
FIG. 7 is a user interface diagram that represents a synchronized communication between one or more vehicles travelling in the same direction in order to allow the at least one pedestrian to safely cross the street, according to one example embodiment.

FIG. 7 is a user interface diagram that represents a synchronized communication between one or more vehicles travelling in the same direction in order to allow the at least one pedestrian to safely cross the street, according to one example embodiment. In one scenario, the at least one pedestrian 701 is trying to cross the street, whereby the one or more vehicles travelling on the street in the same directions [703, 705] and are in close proximity to the pedestrian [701] may detect the presence of the pedestrian. The one or more vehicles may initiate inter-vehicle communication to determine whether the vehicles are in consensus in allowing the pedestrians to cross the road. In one example embodiment, the vehicle [703] may detect the pedestrian [701] and may communicate with the other passing vehicles [705] regarding the pedestrian [701] and his distance from the vehicles [703, 705], to determine whether to allow the pedestrian to cross the street. Subsequently, the coordination platform 109 causes a pedestrian and vehicle communication [707], whereby the at least one vehicle [703] provides feedback to the pedestrian on whether he can cross the street.

Figure 8:
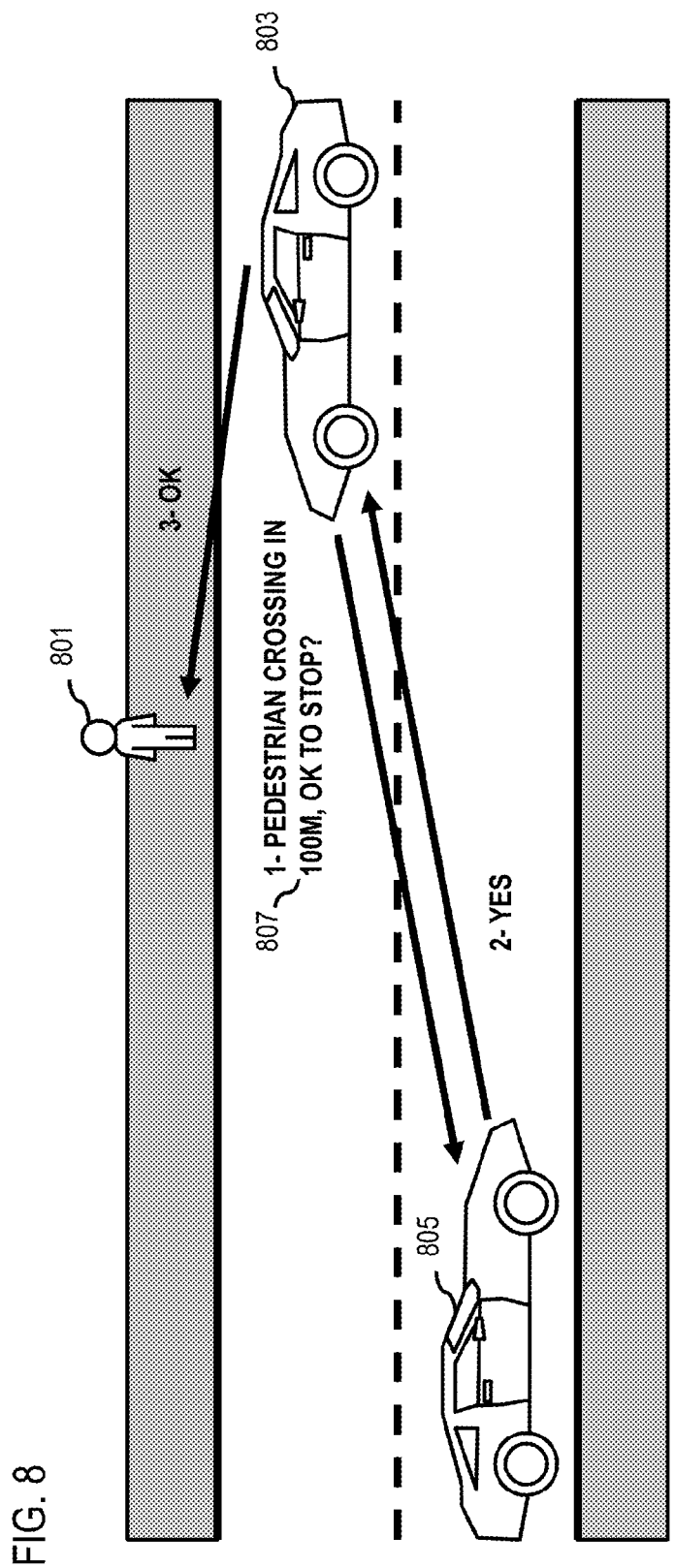
FIG. 8 is a user interface diagram that represents a synchronized communication between one or more vehicles travelling in the opposite direction in order to allow the at least one pedestrian to safely cross the street, according to one example embodiment.

FIG. 8 is a user interface diagram that represents a synchronized communication between one or more vehicles travelling in the opposite direction in order to allow the at least one pedestrian to safely cross the street, according to one example embodiment. It is difficult for a pedestrian 801 to decide when to cross a road with multiple lanes because one driver may agree to let him cross the street but the drivers on the other lanes may not see the pedestrian or agree to let the pedestrian walk through the street. In one scenario, the one or more sensors of the at least one vehicle [803] may detect the at least one pedestrian's location [801] and may communicate with other vehicles travelling in the opposite direction [805] to reach a consensus on whether to allow the pedestrian [801] to cross the street at a certain distance. In another scenario, the at least one vehicle [803] and the at least one other vehicle [805] may negotiate to reach a decision based, at least in part, on the location information [807] for the at least one pedestrian [801]. Once a consensus is reached among the vehicles, their decision is communicated to the pedestrian [801].

Figure 9:
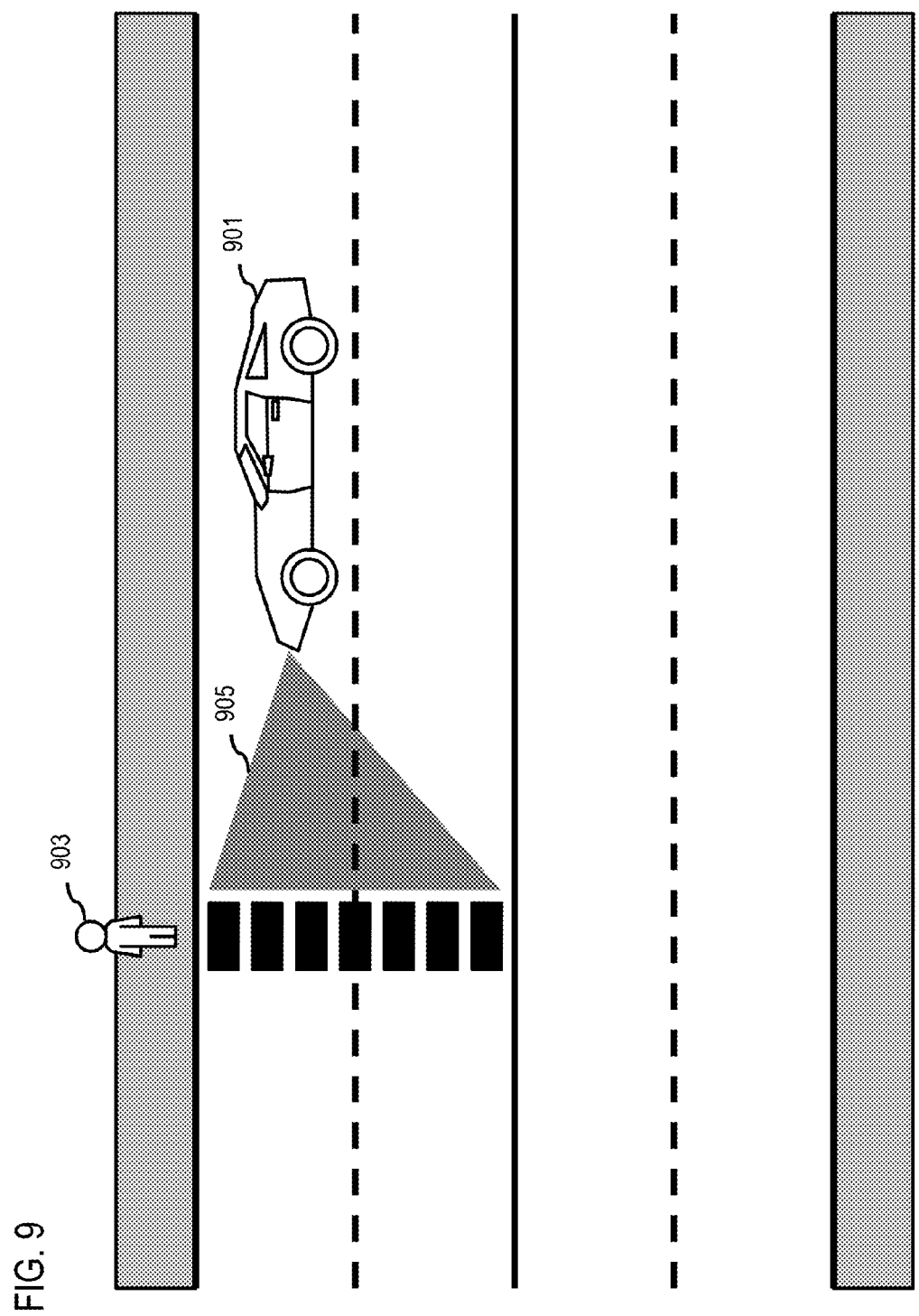
FIG. 9 is a user interface diagram that represents a scenario whereby the at least one vehicle projects a pedestrian crossing symbol on the ground as an indication to the pedestrian that he can safely cross the street, according to one example embodiment.

FIG. 9 is a user interface diagram that represents a scenario whereby the at least one vehicle projects a pedestrian crossing symbol on the ground as an indication to the pedestrian that he can safely cross the street, according to one example embodiment. In one scenario, the at least one vehicle [901] may determine to allow the at least one detected pedestrian [903] to safely cross the street. The driver of the at least one vehicle [901] may clearly indicate the at least one pedestrian [903] that he can cross the street by projecting a pedestrian crossing symbol on the ground [905]. In another scenario, such projection of pedestrian crossing symbol on the ground assists the at least one pedestrian in understanding that the driver has seen him and has acknowledged that he can safely walk through the street. In one embodiment, the coordination platform 109 may synchronize the projection of the pedestrian crossing symbol between multiple vehicles in different lanes, wherein the pedestrian crossing symbol may be projected throughout the street.

Figure 10:
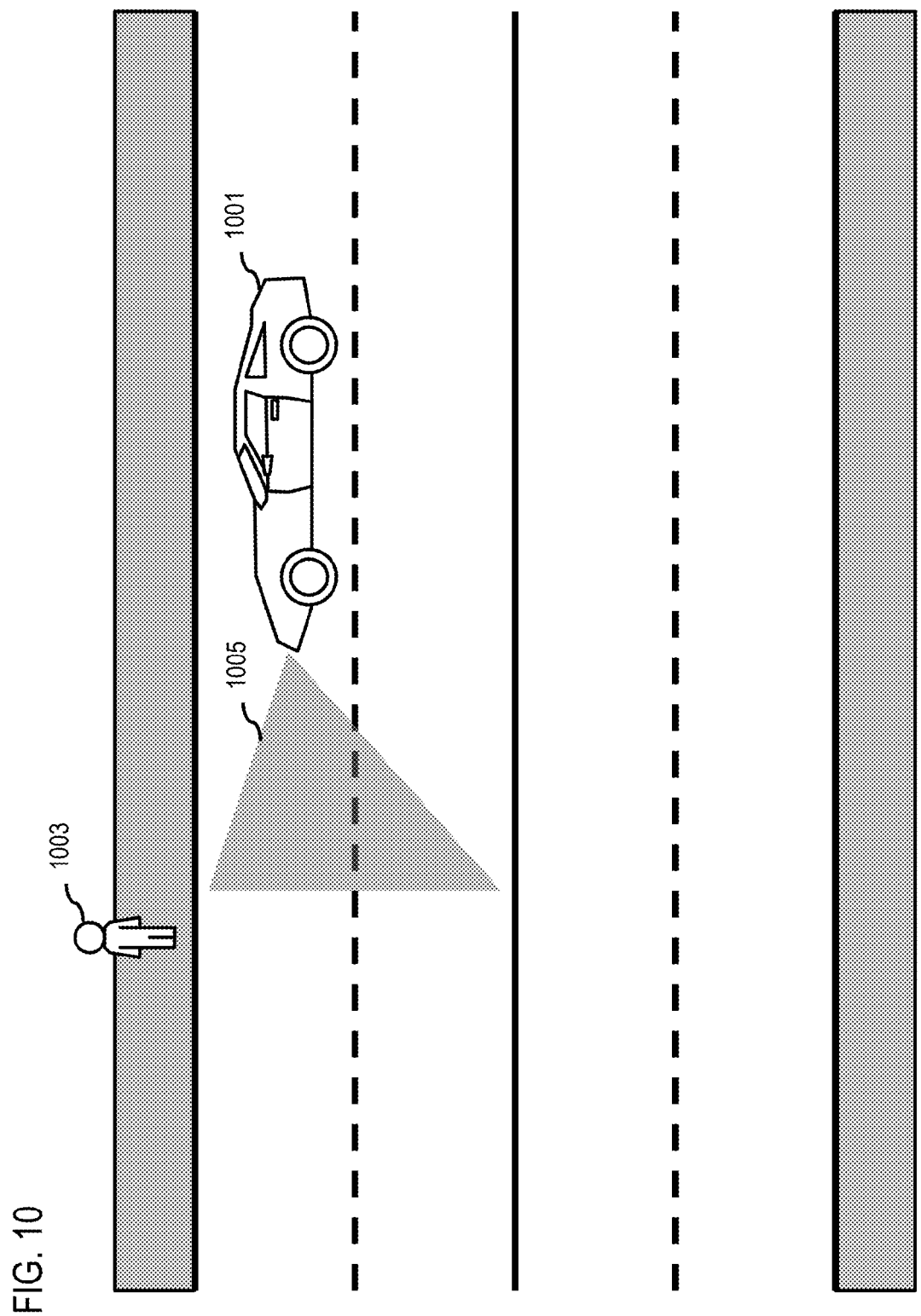
FIG. 10 is a user interface diagram that represents a scenario wherein the at least one vehicle causes a presentation of either a green light or a red light on the ground as an indication to the pedestrian of their decision on whether a pedestrian can cross the street, according to one example embodiment.

FIG. 10 is a user interface diagram that represents a scenario wherein the at least one vehicle causes a presentation of either a green light or a red light on the ground as an indication to the pedestrian of their decision on whether a pedestrian can cross the street, according to one example embodiment. In one scenario, the at least one vehicle [1001] detects a pedestrian location [1003] and communicates with other vehicles (travelling in the same direction and/or the opposite direction) to reach a consensus on allowing a pedestrian to cross the street at a certain distance. Once a consensus is reached among the vehicles, their decision is communicated to the at least one pedestrian [1003] by projecting at least one color on the ground [1005]. In one scenario, a projection of a green light [1005] by the at least one vehicle [1001] suggests that the least one pedestrian [1003] can safely cross the street, whereas projection of a red light on the ground [1005] by the at least one vehicle [1001] suggests that the vehicles cannot stop and the pedestrian should not cross the street.

Figure 11:
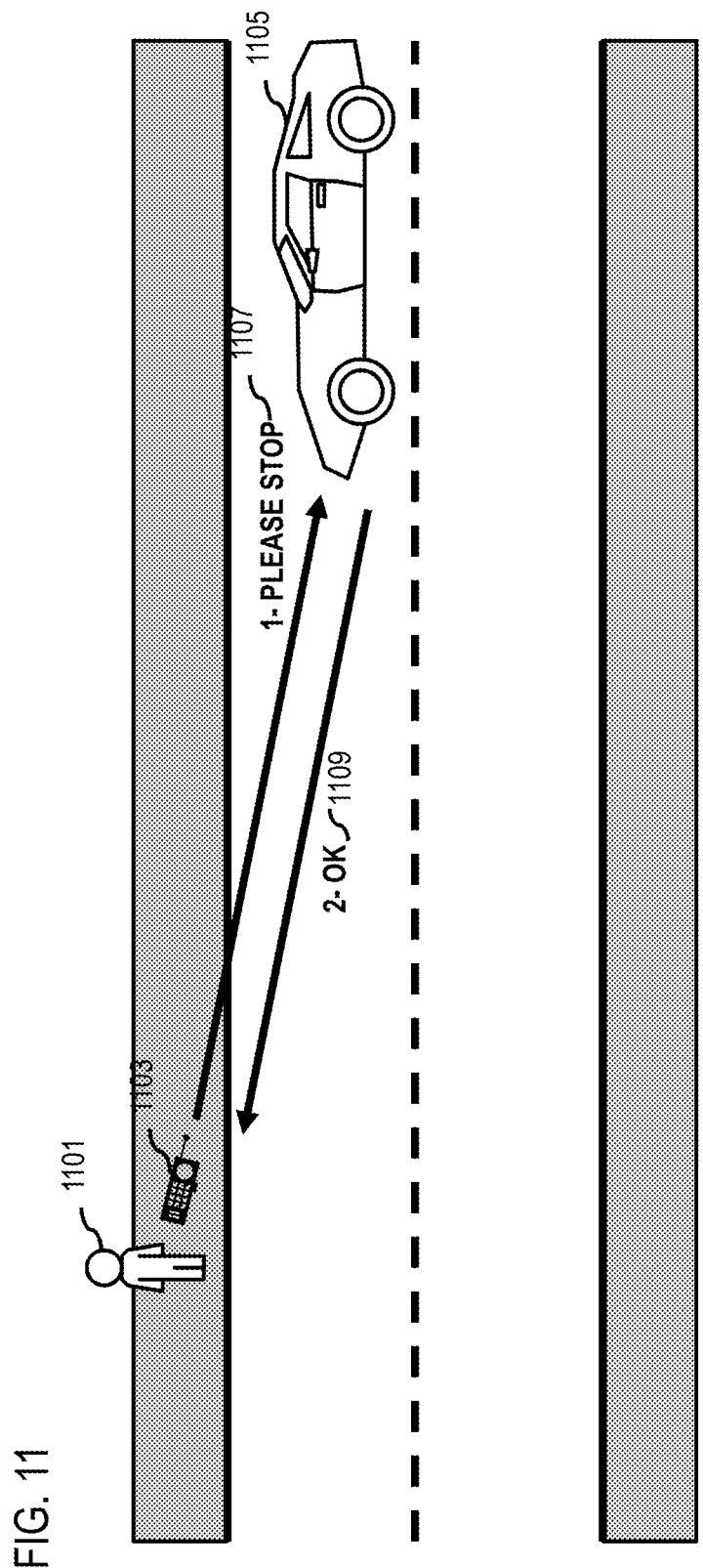
FIG. 11 is a user interface diagram that represents a scenario whereby the at least one pedestrian requests the at least one moving vehicle to stop by pointing his mobile communication device at the at least one moving vehicle, according to one example embodiment.

FIG. 11 is a user interface diagram that represents a scenario whereby the at least one pedestrian requests the at least one moving vehicle to stop by pointing his mobile communication device at the at least one moving vehicle, according to one example embodiment. In one scenario, the at least one pedestrian [1101] may point his UE 101 [1103] at the at least one moving vehicle [1105], whereby the UE 101 [1103] may send a request to the at least one moving vehicle [1105] to stop [1107] via one or more sensors and/or wireless technologies. Subsequently, the at least one vehicle [1105] may process the request and may give feedback to the UE 101[1103] of the at least one pedestrian [1101] on whether it is safe to cross the street or not [1109].

Figure 12:
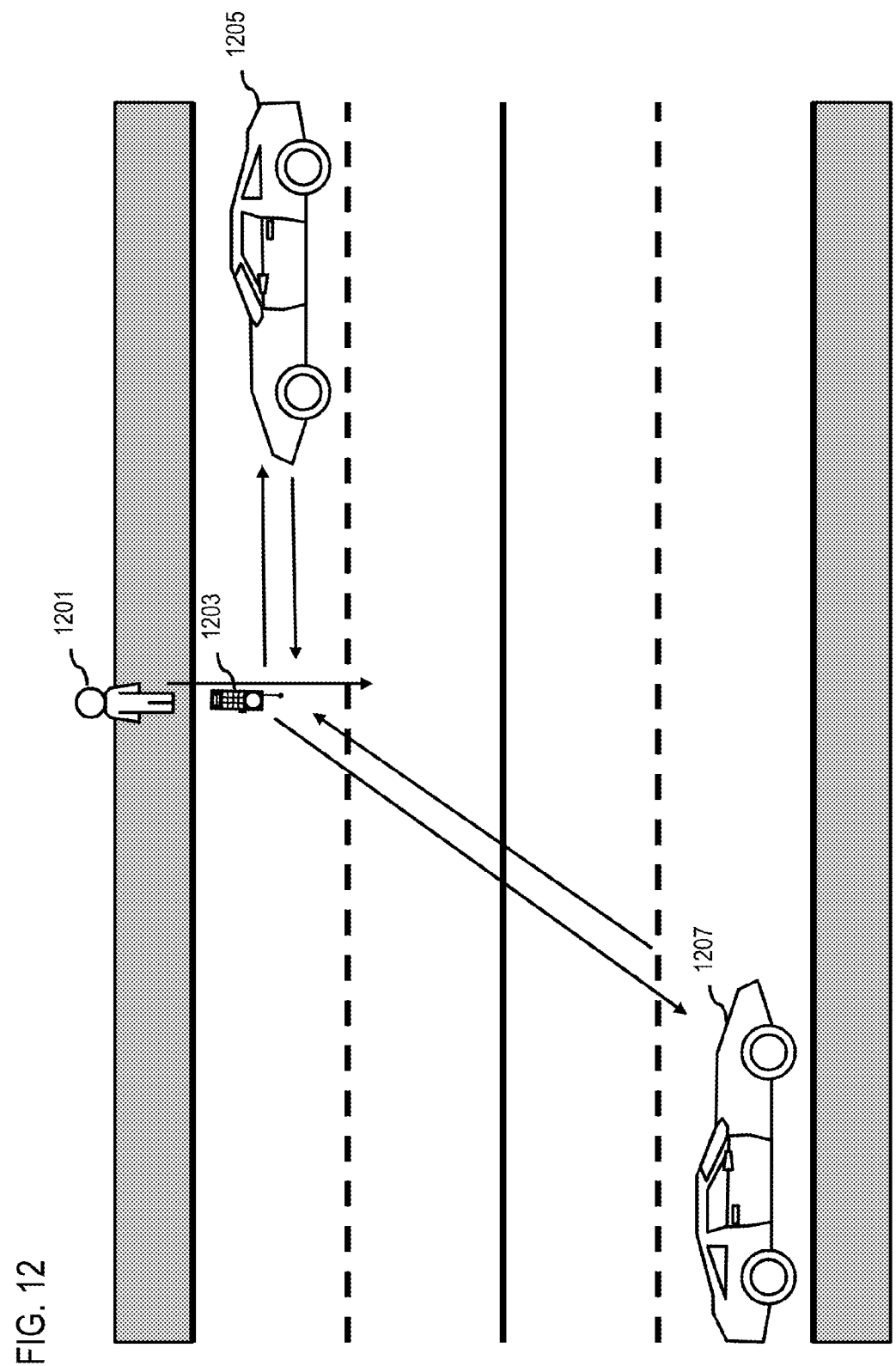
FIG. 12 is a user interface diagram that represents a scenario wherein the at least one pedestrian points his mobile communication device at the road to request the one or more approaching vehicles to stop, according to one example embodiment.

FIG. 12 is a user interface diagram that represents a scenario wherein the at least one pedestrian points his mobile communication device at the road to request the one or more approaching vehicles to stop, according to one example embodiment. In one scenario, the at least one pedestrian [1201] is located on the side of the street and points his UE 101 [1203] towards the road. Subsequently, the one or more approaching vehicles [1205, 1207] may receive a request to let him cross the street and may stop. The one or more approaching vehicles [1205, 1207] may receive the request via one or more sensors and/or wireless technologies. Once the communication is established with the vehicles and the request is successful, the at least one pedestrian [1201] may receive a feedback whereby his request sending UE 101 [1203] may vibrate indicating that he may safely cross the street.

Figure 13:
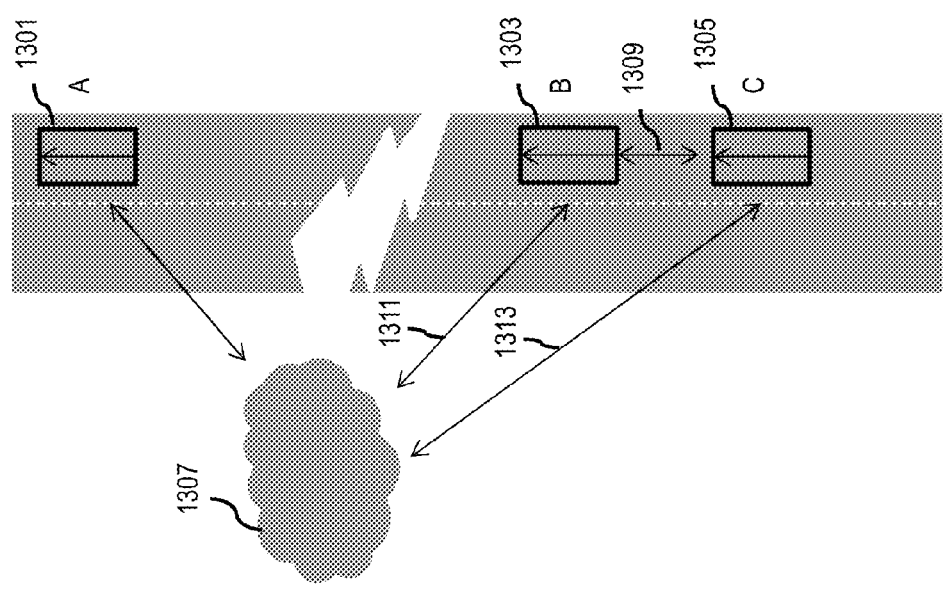
FIG. 13 is a user interface diagram that represents a scenario wherein one or more vehicles are communicating over local connectivity and/or cloud services to provide information on their status, according to one example embodiment.

FIG. 13 is a user interface diagram that represents a scenario wherein one or more vehicles are communicating over local connectivity and/or cloud services to provide information on their status, according to one example embodiment. In one scenario, to optimize the traffic, including the speed of the vehicles, one or more vehicles [1301, 1303 1305] may be connected to a cloud service [1307]. Any changes in the location, the speed, the condition, etc. for each vehicle [1301, 1303 1305] is pursued and communicated with the vehicles impacted. In one example embodiment, the location and the speed for vehicle A [1301] is transferred over the cellular network to the cloud service [1307], whereby the cloud service [1307] informs vehicle B [1303] and vehicle C [1305] of the location and the speed of vehicle A [1301] that is positioned ahead of them. This allows vehicle B [1303] and vehicle C [1305] to adjust their speed to the speed of vehicle A [1301] as well as optimize the fuel consumption, etc., by defining the safety distance and the speed which is used when approaching vehicle A. In one scenario, the distance between vehicle A [1301] and vehicle B [1302] may be too long for the sensors to detect, thus vehicle B [1303] may rely on the information provided by the cloud service [1307]. In another scenario, vehicle B [1303] and vehicle C [1305] are directly communicating with each other over local connectivity [1309], as well as connecting over cloud service [1311, 1313] to provide information of their status to other vehicles and road users.

FIG. 14 is a user interface diagram that represents a scenario wherein the at least one vehicle is equipped with numerous sensors to detect one or more objects in the surrounding, according to one example embodiment. In one scenario, the at least one vehicle A [1401] may be equipped with numerous sensors [1403, 1405, 1407] placed within and outside of the vehicle A [1401] to detect any obstacles and/or nearby objects. The one or more sensors [1403, 1405, 1407] may include cameras, infrared, radar, etc., which are designed to detect objects and/or obstacles which are generally in the line of sight. However, the one or more sensors [1403, 1405, 1407] cannot detect any hidden objects which are not in the line of sight.

Figure 15:
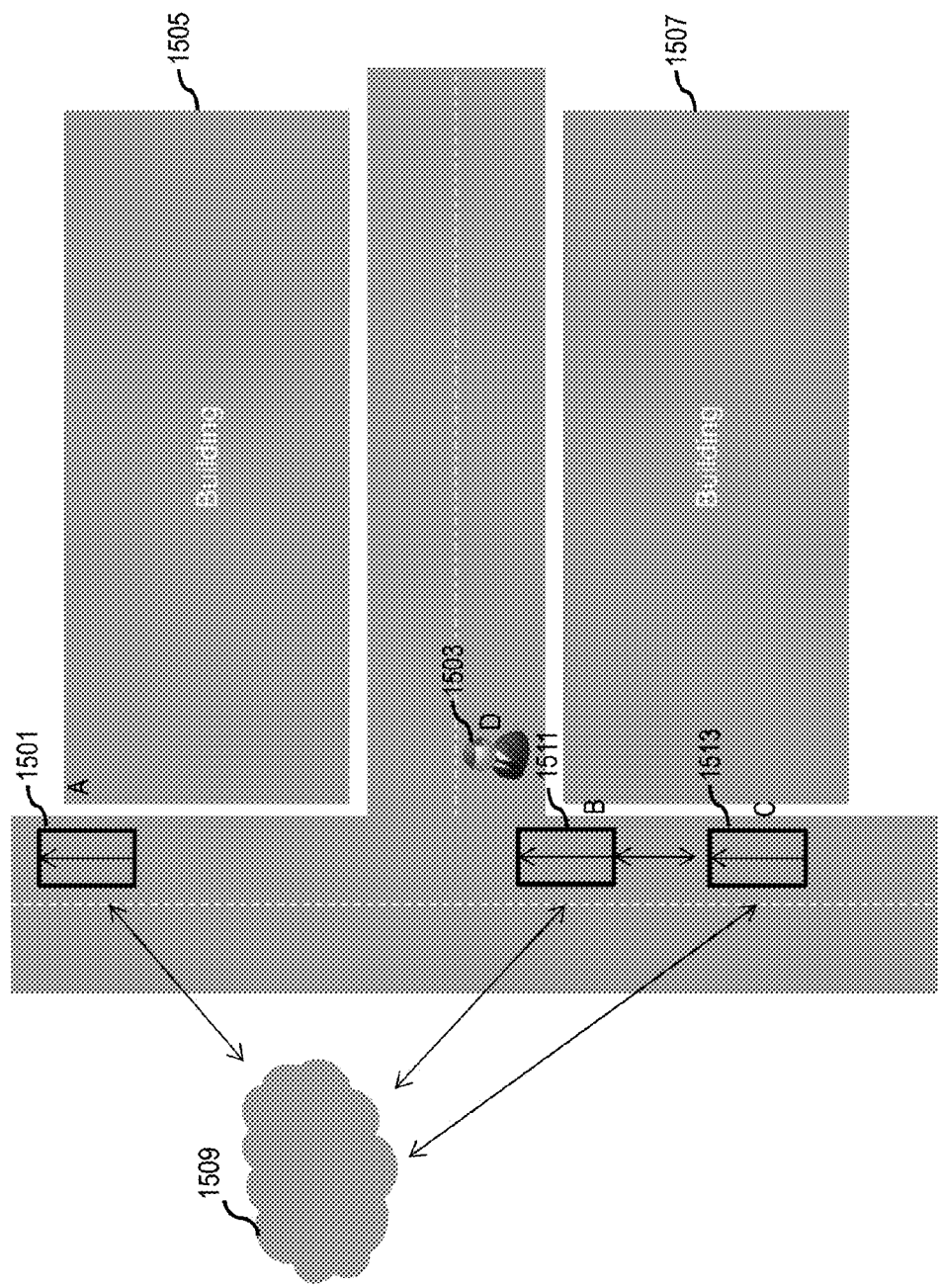
FIG. 15 is a user interface diagram that represents a scenario wherein the at least one vehicle shares information of an obstacle on the road to other vehicles via cloud services, according to one example embodiment.

FIG. 15 is a user interface diagram that represents a scenario wherein the at least one vehicle shares information of an obstacle on the road to other vehicles via cloud services, according to one example embodiment. In one example embodiment, Vehicle A [1501] passes by a pedestrian D [1503] and detects the pedestrian [1503] with the one or more sensors placed on the side of the vehicle A [1501]. Due to one or more buildings [1505, 1507] blocking the view of pedestrian D [1503], he was only detected 3 meters before the crossing by one or more sensors of vehicle A [1501]. Then, Vehicle A [1501] updates the location of pedestrian D [1503] to the cloud service [1509], which shares the location of pedestrian D [1503] with vehicle B [1511] and vehicle C [1513]. This solution is available to one or more vehicles and the road infrastructure that is connected to the cloud service [1509], wherein one or more connected vehicles are able to share information of obstacles on the road to other vehicles. On the other hand, there have been instances wherein the system neither detects the location of one or more pedestrians which are not yet visible in the line of sight, nor does the system detect the potential intention of the pedestrian to move around or estimate the location of the pedestrian at the time the at least one vehicle is near the pedestrian. In addition to this, the one or more vehicles do not communicate and/or share the location of the identified pedestrians with each other. In one example embodiment, the coordination platform 109 may estimate the possible location of pedestrian D [1503] when vehicle B [1511] is approaching nearby pedestrian D [1503]. Further, the coordination platform 109 may detect the movement of pedestrian D [1503] to know the average speed of pedestrian D [1503] when walking or running In another embodiment, the coordination platform 109 may generate certain radius around the location of pedestrian D [1503], wherein the length of the radius may be affected by the movement of pedestrian D [1503]. In one scenario, when vehicle B [1511] and vehicle C [1513] are approaching the boundaries of the radius, both the vehicles [1511, 1513] can slow down or prepare for an activity. In another scenario, when vehicle B [1511] passes by the pedestrian D [1503], the coordination platform 109 may update the location information, the radius, the direction of the movement etc., whereby vehicle C [1513] may receive the updated information pertaining to the location of pedestrian D [1503], type of movement of pedestrian D [1503], and the direction of movement of pedestrian D [1513].

Figure 16:
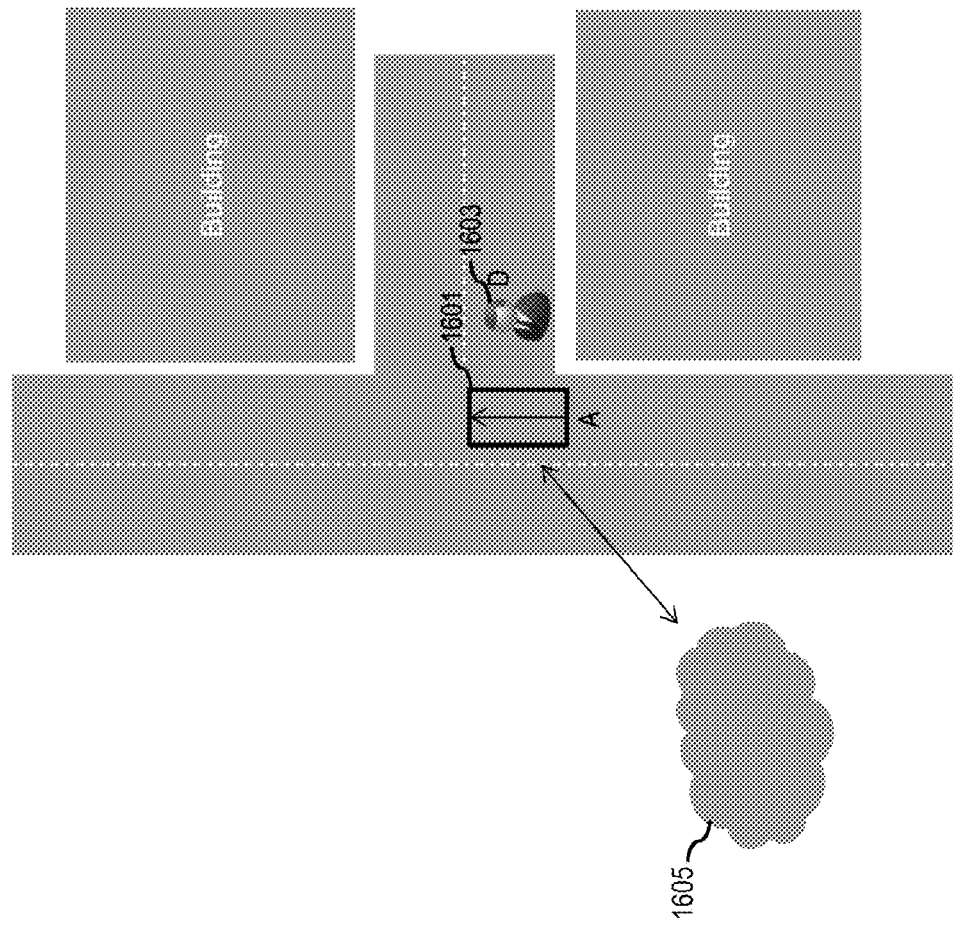
FIG. 16A-16C are user interface diagrams that represents a scenario wherein the movements of one or more vehicles are synchronized based, at least in part, on the presence of at least one pedestrian, according to one example embodiment.
Figure 16:
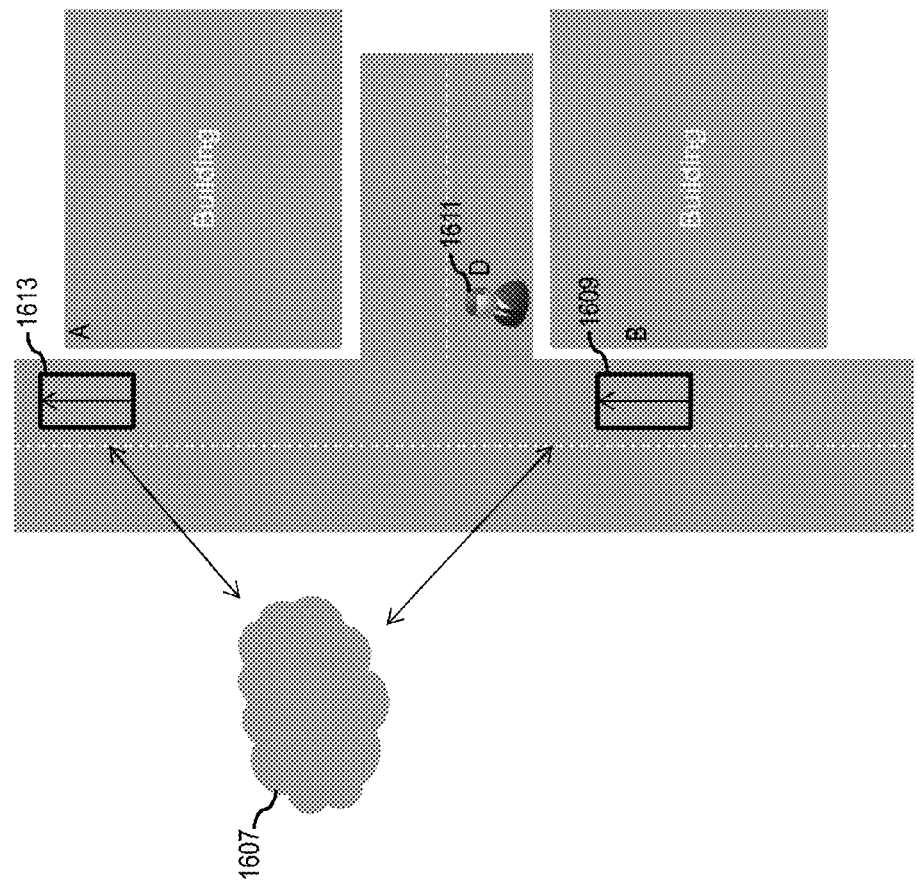
Figure 16:
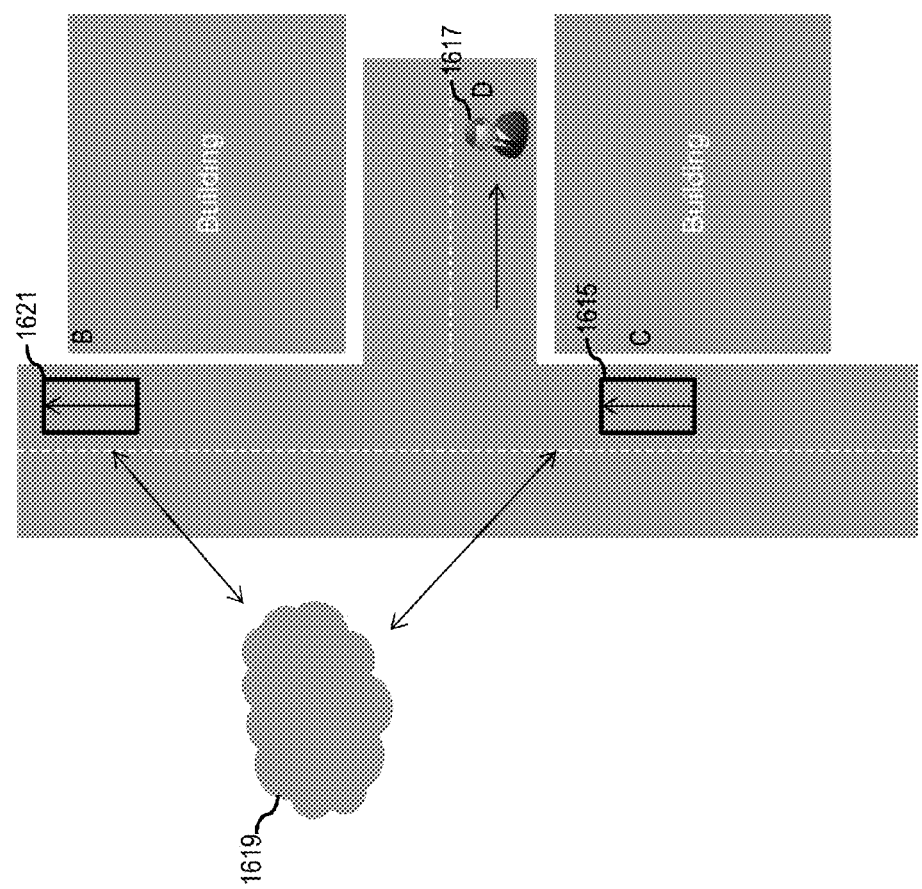

FIG. 16A-16C are user interface diagrams that represents a scenario wherein the movements of one or more vehicles are synchronized based, at least in part, on the presence of at least one pedestrian, according to one example embodiment. In FIG. 16A, the vehicle A [1601] detects pedestrian D [1603] in a crossing and updates the location of pedestrian D to the cloud service [1605]. Then, in FIG. 16B the coordination platform 109 via cloud service [1607] may notify vehicle B [1609] about the presence of pedestrian D [1611] based, at least in part, on the information provided by vehicle A [1613]. Since vehicle B [1609] is aware of the estimated location of pedestrian D [1611] and the radius, vehicle B [1609] may slow down when approaching the crossing. In FIG. 16C, vehicle C [1615] is now aware of the estimated location of pedestrian D [1617], the radius, and the direction of the movement of pedestrian D [1617] via cloud service [1619] based, at least in part, on the information provided by vehicle B [1621]. In one scenario, the coordination platform 109 may advise the one or more vehicles that there is no need to slow down at the crossing (expecting that one or more vehicles, i.e. vehicle B [1621], vehicle C [1615] and any other vehicles driving the same way have priority in the crossing.

Figure 17:
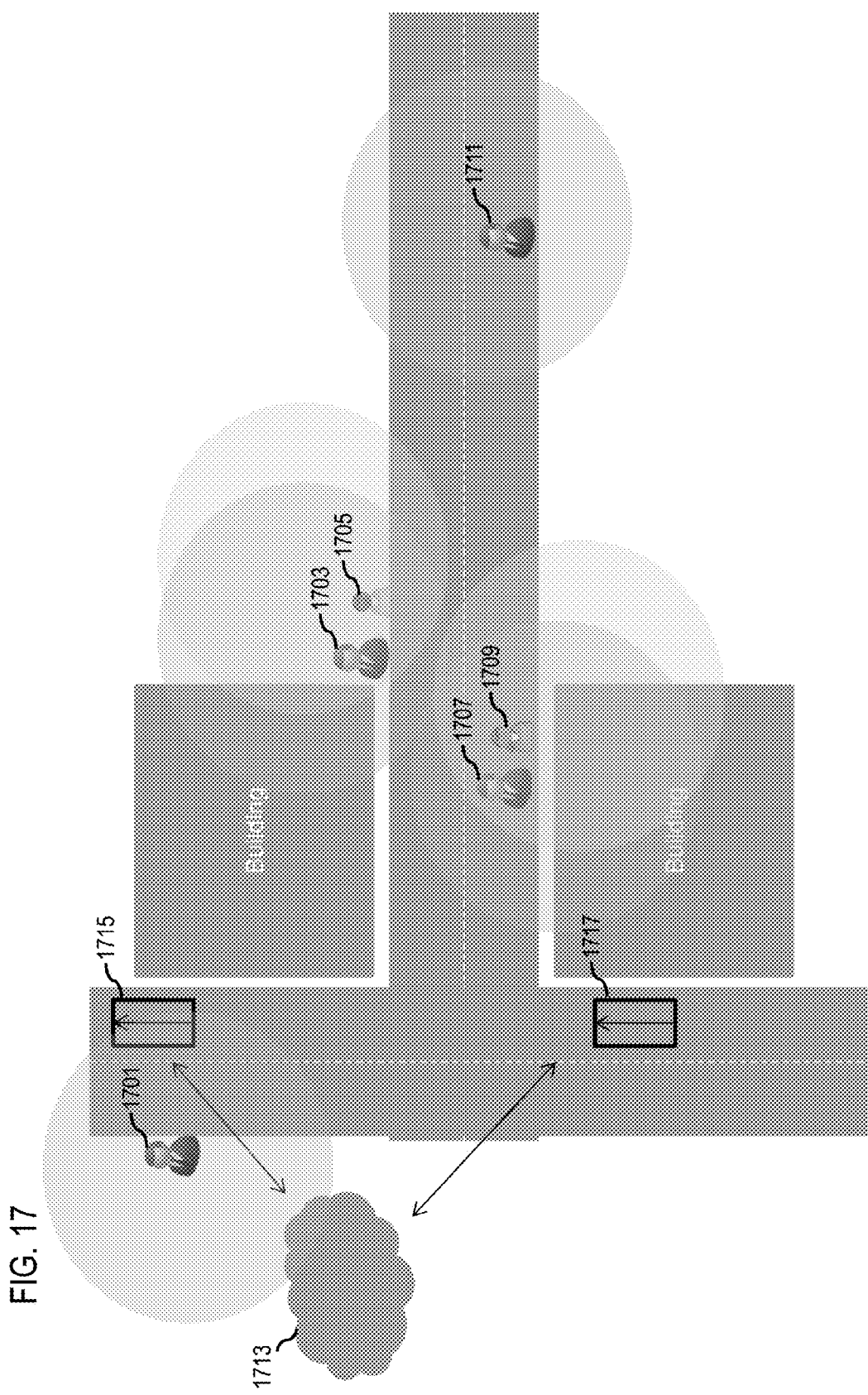
FIG. 17 is a user interface diagram that represents a scenario wherein one or more location information is updated based, at least in part, on the verification of the location information by the one or more passing vehicles, according to one example embodiment

FIG. 17 is a user interface diagram that represents a scenario wherein one or more location information is updated based, at least in part, on the verification of the location information by the one or more passing vehicles, according to one example embodiment. In one example embodiment, the UE 101 of the one or more users [1701, 1703, 1705, 1707, 1709, 1711] shares location information and direction of movement of the one or more users [1701, 1703, 1705, 1707, 1709, 1711] with the cloud services [1713]. The location of the UE 101 is updated in the cloud services [1713], in which the radius of one or more pedestrians [1701, 1703, 1705, 1707, 1709, 1711] is defined based on the available location information, the direction of their movement and the type of movement. Subsequently, the cloud service [1713] creates an application which may be used to warn the connected and autonomous vehicles [1715, 1717] of any potential pedestrian crossing in a street. The location of the connected sensors is updated through the nearby UE 101. The information is verified by the one or more vehicles [1715, 1717] passing by and detecting the pedestrians. The more information there is, the more accurately the radius and the future location for each pedestrian [1701, 1703, 1705, 1707, 1709, 1711] can be defined, ensuring that especially the autonomous driving vehicles [1715, 1717] have enough information of the potential objects in front. In one scenario, a UE 101 may be connected to numerous sensors, for example, a school kid [1705, 1709] may have a connected sensor within her schoolbag which is connected to her parent's UE 101 [1703, 1707]. The location of a connected sensor, including the direction of movement of the connected sensors may be provided to a cloud service [1713], thereby improving the application for preventing accidents and providing one or more vehicles [1715, 1717] with information prior to at least one pedestrian or at least one object are within the line of sight.

The processes described herein for providing vehicle synchronization to facilitate a crossing may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 18:
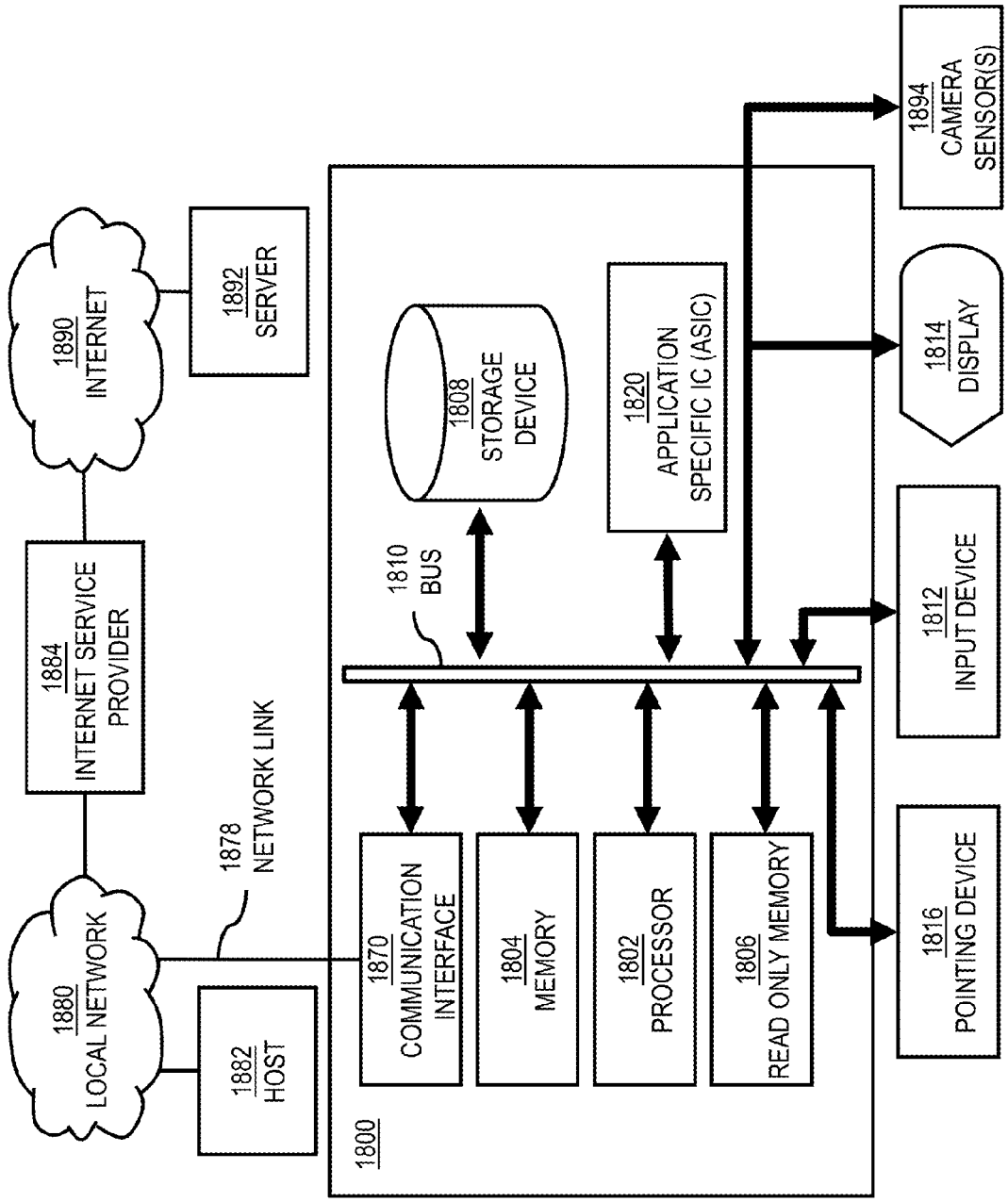
FIG. 18 is a diagram of hardware that can be used to implement an embodiment of the invention.

FIG. 18 illustrates a computer system 1800 upon which an embodiment of the invention may be implemented. Although computer system 1800 is depicted with respect to a particular device or equipment, it is contemplated that other devices or equipment (e.g., network elements, servers, etc.) within FIG. 18 can deploy the illustrated hardware and components of system 1800. Computer system 1800 is programmed (e.g., via computer program code or instructions) to provide vehicle synchronization to facilitate a crossing as described herein and includes a communication mechanism such as a bus 1810 for passing information between other internal and external components of the computer system 1800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1800, or a portion thereof, constitutes a means for performing one or more steps of providing vehicle synchronization to facilitate a crossing.

A bus 1810 includes one or more parallel conductors of information so that information is transferred quickly among devices coupled to the bus 1810. One or more processors 1802 for processing information are coupled with the bus 1810.

A processor (or multiple processors) 1802 performs a set of operations on information as specified by computer program code related to providing vehicle synchronization to facilitate a crossing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1810 and placing information on the bus 1810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1802, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1800 also includes a memory 1804 coupled to bus 1810. The memory 1804, such as a random access memory (RAM) or any other dynamic storage device, stores information including processor instructions for providing vehicle synchronization to facilitate a crossing. Dynamic memory allows information stored therein to be changed by the computer system 1800. RAM allows a unit of information stored at a location called a memory address to be stored and retrieved independently of information at neighboring addresses. The memory 1804 is also used by the processor 1802 to store temporary values during execution of processor instructions. The computer system 1800 also includes a read only memory (ROM) 1806 or any other static storage device coupled to the bus 1810 for storing static information, including instructions, that is not changed by the computer system 1800. Some memory is composed of volatile storage that loses the information stored thereon when power is lost. Also coupled to bus 1810 is a non-volatile (persistent) storage device 1808, such as a magnetic disk, optical disk or flash card, for storing information, including instructions, that persists even when the computer system 1800 is turned off or otherwise loses power.

Information, including instructions for providing vehicle synchronization to facilitate a crossing is provided to the bus 1810 for use by the processor from an external input device 1812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1800. Other external devices coupled to bus 1810, used primarily for interacting with humans, include a display device 1814, such as a cathode ray tube (CRT), a liquid crystal display (LCD), a light emitting diode (LED) display, an organic LED (OLED) display, a plasma screen, or a printer for presenting text or images, and a pointing device 1816, such as a mouse, a trackball, cursor direction keys, or a motion sensor, for controlling a position of a small cursor image presented on the display 1814 and issuing commands associated with graphical elements presented on the display 1814, and one or more camera sensors 1894 for capturing, recording and causing to store one or more still and/or moving images (e.g., videos, movies, etc.) which also may comprise audio recordings. In some embodiments, for example, in embodiments in which the computer system 1800 performs all functions automatically without human input, one or more of external input device 1812, display device 1814 and pointing device 1816 may be omitted.

In the illustrated embodiment, special purpose hardware, such as an application specific integrated circuit (ASIC) 1820, is coupled to bus 1810. The special purpose hardware is configured to perform operations not performed by processor 1802 quickly enough for special purposes. Examples of ASICs include graphics accelerator cards for generating images for display 1814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1800 also includes one or more instances of a communications interface 1870 coupled to bus 1810. Communication interface 1870 provides a one-way or two-way communication coupling to a variety of external devices that operate with their own processors, such as printers, scanners and external disks. In general the coupling is with a network link 1878 that is connected to a local network 1880 to which a variety of external devices with their own processors are connected. For example, communication interface 1870 may be a parallel port or a serial port or a universal serial bus (USB) port on a personal computer. In some embodiments, communications interface 1870 is an integrated services digital network (ISDN) card or a digital subscriber line (DSL) card or a telephone modem that provides an information communication connection to a corresponding type of telephone line. In some embodiments, a communication interface 1870 is a cable modem that converts signals on bus 1810 into signals for a communication connection over a coaxial cable or into optical signals for a communication connection over a fiber optic cable. As another example, communications interface 1870 may be a local area network (LAN) card to provide a data communication connection to a compatible LAN, such as Ethernet. Wireless links may also be implemented. For wireless links, the communications interface 1870 sends or receives or both sends and receives electrical, acoustic or electromagnetic signals, including infrared and optical signals, that carry information streams, such as digital data. For example, in wireless handheld devices, such as mobile telephones like cell phones, the communications interface 1870 includes a radio band electromagnetic transmitter and receiver called a radio transceiver. In certain embodiments, the communications interface 1870 enables connection to the communication network 105 for providing vehicle synchronization to facilitate a crossing to the UE 101.

The term "computer-readable medium" as used herein refers to any medium that participates in providing information to processor 1802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1808. Volatile media include, for example, dynamic memory 1804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1820.

Network link 1878 typically provides information communication using transmission media through one or more networks to other devices that use or process the information. For example, network link 1878 may provide a connection through local network 1880 to a host computer 1882 or to equipment 1884 operated by an Internet Service Provider (ISP). ISP equipment 1884 in turn provides data communication services through the public, world-wide packet-switching communication network of networks now commonly referred to as the Internet 1890.

A computer called a server host 1892 connected to the Internet hosts a process that provides a service in response to information received over the Internet. For example, server host 1892 hosts a process that provides information representing video data for presentation at display 1814. It is contemplated that the components of system 1800 can be deployed in various configurations within other computer systems, e.g., host 1882 and server 1892.

At least some embodiments of the invention are related to the use of computer system 1800 for implementing some or all of the techniques described herein. According to one embodiment of the invention, those techniques are performed by computer system 1800 in response to processor 1802 executing one or more sequences of one or more processor instructions contained in memory 1804. Such instructions, also called computer instructions, software and program code, may be read into memory 1804 from another computer-readable medium such as storage device 1808 or network link 1878. Execution of the sequences of instructions contained in memory 1804 causes processor 1802 to perform one or more of the method steps described herein. In alternative embodiments, hardware, such as ASIC 1820, may be used in place of or in combination with software to implement the invention. Thus, embodiments of the invention are not limited to any specific combination of hardware and software, unless otherwise explicitly stated herein.

The signals transmitted over network link 1878 and other networks through communications interface 1870, carry information to and from computer system 1800. Computer system 1800 can send and receive information, including program code, through the networks 1880, 1890 among others, through network link 1878 and communications interface 1870. In an example using the Internet 1890, a server host 1892 transmits program code for a particular application, requested by a message sent from computer 1800, through Internet 1890, ISP equipment 1884, local network 1880 and communications interface 1870. The received code may be executed by processor 1802 as it is received, or may be stored in memory 1804 or in storage device 1808 or any other non-volatile storage for later execution, or both. In this manner, computer system 1800 may obtain application program code in the form of signals on a carrier wave.

Various forms of computer readable media may be involved in carrying one or more sequence of instructions or data or both to processor 1802 for execution. For example, instructions and data may initially be carried on a magnetic disk of a remote computer such as host 1882. The remote computer loads the instructions and data into its dynamic memory and sends the instructions and data over a telephone line using a modem. A modem local to the computer system 1800 receives the instructions and data on a telephone line and uses an infra-red transmitter to convert the instructions and data to a signal on an infra-red carrier wave serving as the network link 1878. An infrared detector serving as communications interface 1870 receives the instructions and data carried in the infrared signal and places information representing the instructions and data onto bus 1810. Bus 1810 carries the information to memory 1804 from which processor 1802 retrieves and executes the instructions using some of the data sent with the instructions. The instructions and data received in memory 1804 may optionally be stored on storage device 1808, either before or after execution by the processor 1802.

Figure 19:
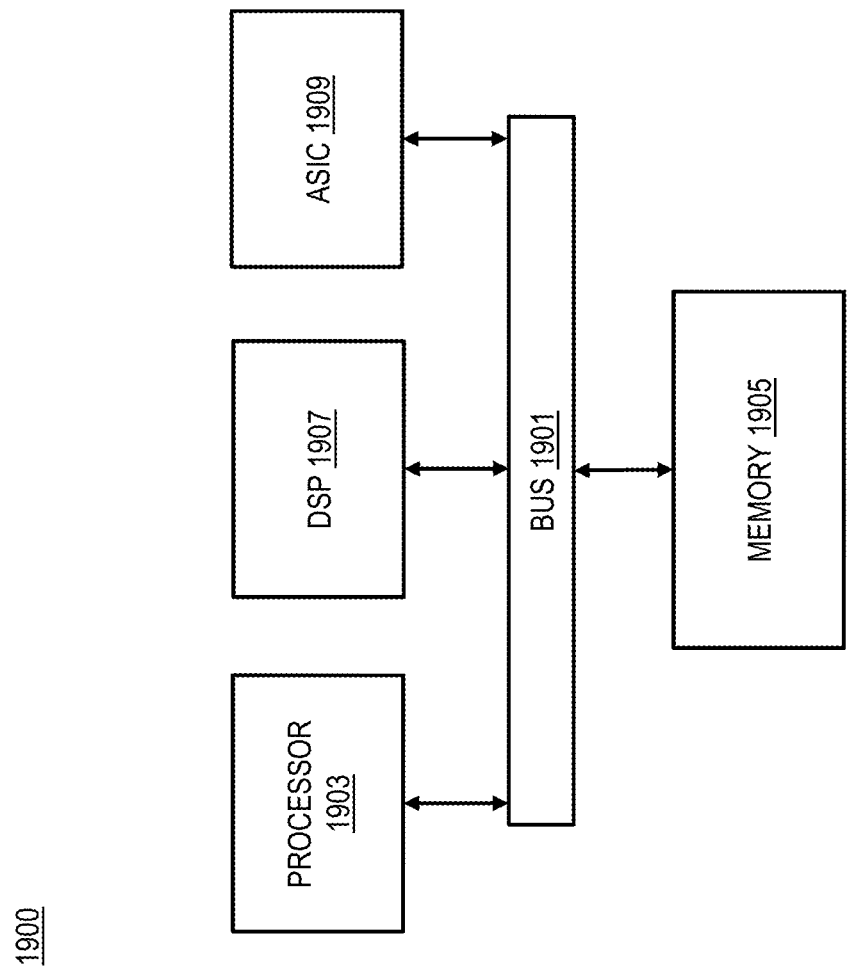
FIG. 19 is a diagram of a chip set that can be used to implement an embodiment of the invention.

FIG. 19 illustrates a chip set or chip 1900 upon which an embodiment of the invention may be implemented. Chip set 1900 is programmed to provide vehicle synchronization to facilitate a crossing as described herein and includes, for instance, the processor and memory components described with respect to FIG. 18 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1900 can be implemented in a single chip. It is further contemplated that in certain embodiments the chip set or chip 1900 can be implemented as a single "system on a chip." It is further contemplated that in certain embodiments a separate ASIC would not be used, for example, and that all relevant functions as disclosed herein would be performed by a processor or processors. Chip set or chip 1900, or a portion thereof, constitutes a means for performing one or more steps of providing user interface navigation information associated with the availability of functions. Chip set or chip 1900, or a portion thereof, constitutes a means for performing one or more steps of providing vehicle synchronization to facilitate a crossing.

In one embodiment, the chip set or chip 1900 includes a communication mechanism such as a bus 1901 for passing information among the components of the chip set 1900. A processor 1903 has connectivity to the bus 1901 to execute instructions and process information stored in, for example, a memory 1905. The processor 1903 may include one or more processing cores with each core configured to perform independently. A multi-core processor enables multiprocessing within a single physical package. Examples of a multi-core processor include two, four, eight, or greater numbers of processing cores. Alternatively or in addition, the processor 1903 may include one or more microprocessors configured in tandem via the bus 1901 to enable independent execution of instructions, pipelining, and multithreading. The processor 1903 may also be accompanied with one or more specialized components to perform certain processing functions and tasks such as one or more digital signal processors (DSP) 1907, or one or more application-specific integrated circuits (ASIC) 1909. A DSP 1907 typically is configured to process real-world signals (e.g., sound) in real time independently of the processor 1903. Similarly, an ASIC 1909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1900 includes merely one or more processors and some software and/or firmware supporting and/or relating to and/or for the one or more processors.

The processor 1903 and accompanying components have connectivity to the memory 1905 via the bus 1901. The memory 1905 includes both dynamic memory (e.g., RAM, magnetic disk, writable optical disk, etc.) and static memory (e.g., ROM, CD-ROM, etc.) for storing executable instructions that when executed perform the inventive steps described herein to provide vehicle synchronization to facilitate a crossing. The memory 1905 also stores the data associated with or generated by the execution of the inventive steps.

Figure 20:
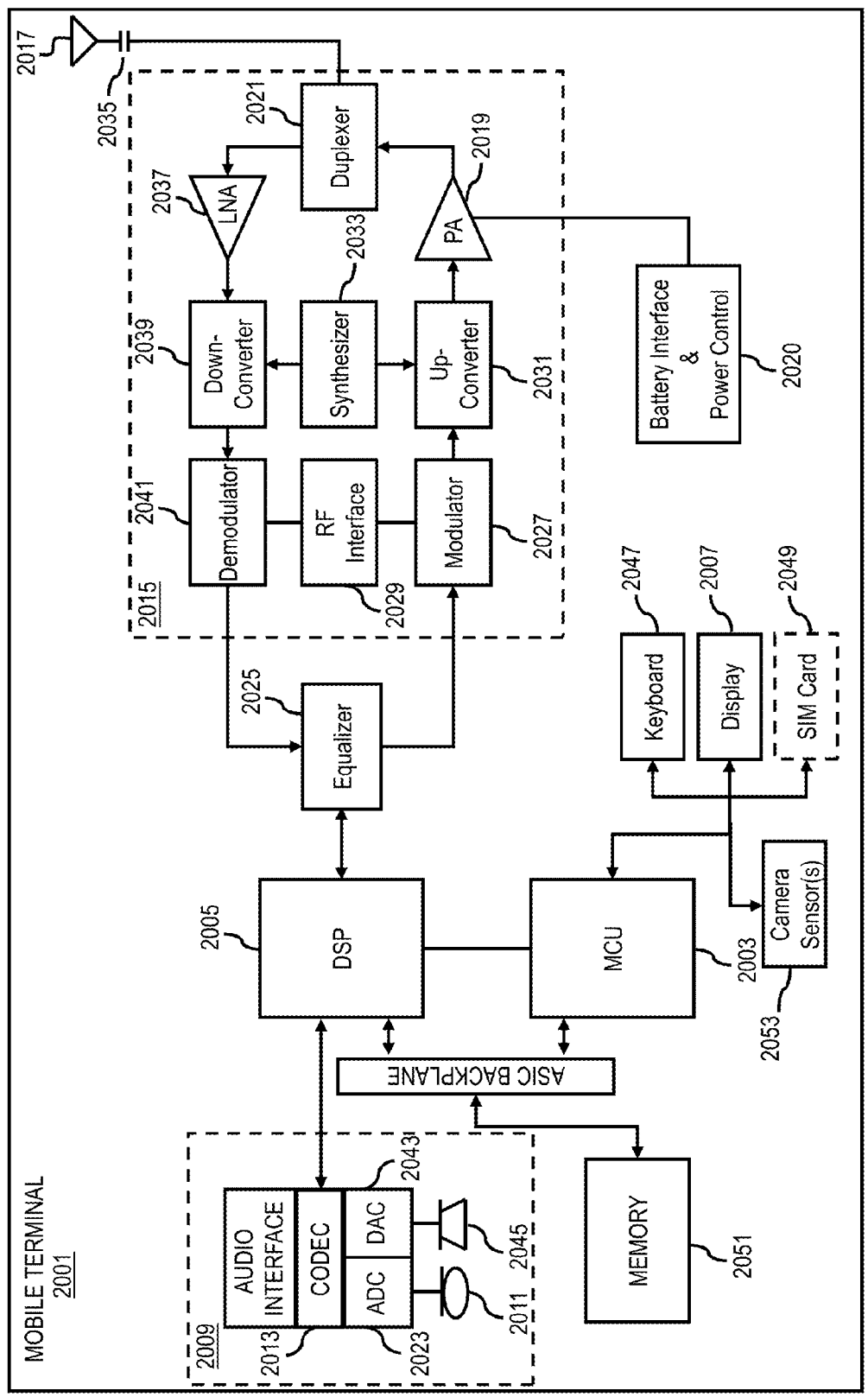
FIG. 20 is a diagram of a mobile terminal (e.g., handset) that can be used to implement an embodiment of the invention.

FIG. 20 is a diagram of exemplary components of a mobile terminal (e.g., handset) for communications, which is capable of operating in the system of FIG. 1, according to one embodiment. In some embodiments, mobile terminal 2001, or a portion thereof, constitutes a means for performing one or more steps of providing vehicle synchronization to facilitate a crossing. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 2003, a Digital Signal Processor (DSP) 2005, and a receiver/transmitter unit including a microphone gain control unit and a speaker gain control unit. A main display unit 2007 provides a display to the user in support of various applications and mobile terminal functions that perform or support the steps of providing vehicle synchronization to facilitate a crossing. The display 2007 includes display circuitry configured to display at least a portion of a user interface of the mobile terminal (e.g., mobile telephone). Additionally, the display 2007 and display circuitry are configured to facilitate user control of at least some functions of the mobile terminal. An audio function circuitry 2009 includes a microphone 2011 and microphone amplifier that amplifies the speech signal output from the microphone

2011. The amplified speech signal output from the microphone 2011 is fed to a coder/decoder (CODEC) 2013.

A radio section 2015 amplifies power and converts frequency in order to communicate with a base station, which is included in a mobile communication system, via antenna 2017. The power amplifier (PA) 2019 and the transmitter/modulation circuitry are operationally responsive to the MCU 2003, with an output from the PA 2019 coupled to the duplexer 2021 or circulator or antenna switch, as known in the art. The PA 2019 also couples to a battery interface and power control unit 2020.

In use, a user of mobile terminal 2001 speaks into the microphone 2011 and his or her voice along with any detected background noise is converted into an analog voltage. The analog voltage is then converted into a digital signal through the Analog to Digital Converter (ADC) 2023. The control unit 2003 routes the digital signal into the DSP 2005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 2025 for compensation of any frequency-dependent impairments that occur during transmission though the air such as phase and amplitude distortion. After equalizing the bit stream, the modulator 2027 combines the signal with a RF signal generated in the RF interface 2029. The modulator 2027 generates a sine wave by way of frequency or phase modulation. In order to prepare the signal for transmission, an up-converter 2031 combines the sine wave output from the modulator 2027 with another sine wave generated by a synthesizer 2033 to achieve the desired frequency of transmission. The signal is then sent through a PA 2019 to increase the signal to an appropriate power level. In practical systems, the PA 2019 acts as a variable gain amplifier whose gain is controlled by the DSP 2005 from information received from a network base station. The signal is then filtered within the duplexer 2021 and optionally sent to an antenna coupler 2035 to match impedances to provide maximum power transfer. Finally, the signal is transmitted via antenna 2017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 2001 are received via antenna 2017 and immediately amplified by a low noise amplifier (LNA) 2037. A down-converter 2039 lowers the carrier frequency while the demodulator 2041 strips away the RF leaving only a digital bit stream. The signal then goes through the equalizer 2025 and is processed by the DSP 2005. A Digital to Analog Converter (DAC) 2043 converts the signal and the resulting output is transmitted to the user through the speaker 2045, all under control of a Main Control Unit (MCU) 2003 which can be implemented as a Central Processing Unit (CPU).

The MCU 2003 receives various signals including input signals from the keyboard 2047. The keyboard 2047 and/or the MCU 2003 in combination with other user input components (e.g., the microphone 2011) comprise a user interface circuitry for managing user input. The MCU 2003 runs a user interface software to facilitate user control of at least some functions of the mobile terminal 2001 to provide vehicle synchronization to facilitate a crossing. The MCU 2003 also delivers a display command and a switch command to the display 2007 and to the speech output switching controller, respectively. Further, the MCU 2003 exchanges information with the DSP 2005 and can access an optionally incorporated SIM card 2049 and a memory 2051. In addition, the MCU 2003 executes various control functions required of the terminal. The DSP 2005 may, depending upon the implementation, perform any of a variety of conventional digital processing functions on the voice signals. Additionally, DSP 2005 determines the background noise level of the local environment from the signals detected by microphone 2011 and sets the gain of microphone 2011 to a level selected to compensate for the natural tendency of the user of the mobile terminal 2001.

The CODEC 2013 includes the ADC 2023 and DAC 2043. The memory 2051 stores various data including call incoming tone data and is capable of storing other data including music data received via, e.g., the global Internet. The software module could reside in RAM memory, flash memory, registers, or any other form of writable storage medium known in the art. The memory device 2051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 2049 carries, for instance, important information, such as the cellular phone number, the carrier supplying service, subscription details, and security information. The SIM card 2049 serves primarily to identify the mobile terminal 2001 on a radio network. The card 2049 also contains a memory for storing a personal telephone number registry, text messages, and user specific mobile terminal settings.

Further, one or more camera sensors 2053 may be incorporated onto the mobile station 2001 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   at least one determination of at least one intention to perform at least one crossing of at least one object within proximity of at least one first vehicle;
   at least one determination of at least one second vehicle within proximity of the at least one crossing, the at least one first vehicle, or a combination thereof;

a signaling among at least one first device associated with the at least one first vehicle and at least one second device associated with the at least one second vehicle, wherein the signaling causes, at least in part, a synchronization of at least one movement, at least one stop, the at least one intention to perform the at least one crossing, or a combination thereof among the at least one first vehicle, the at least one second vehicle, at least one cloud service, or a combination thereof in response to the at least one intention and;

at least one determination of the at least one intention to perform the at least one crossing based, at least in part, on a signaling from at least one third device associated with the at least one object, a detection of the at least one object, or a combination thereof.

2. A method of claim 1, wherein the (1) data and/or (2) information and/or (3) at least one signal are further based, at least in part, on the following:

a presentation of at least one indicator to the at least one object, wherein at least one indicator signals to the at least one object that the at least one crossing can or cannot be performed based, at least in part, on the synchronization of at least one movement, the at least one stop, or a combination thereof.

3. A method of claim 2, wherein the at least one indicator includes, at least in part, at least one crossing symbol projected by the at least one first vehicle, the at least one second vehicle, or a combination thereof.

4. A method of claim 3, wherein at least one crossing symbol is projected on to at least one crossing path to be used for that at least one crossing.

5. A method of claim 2, wherein the at least one indicator includes, at least in part, a first colored light for indicating that the at least one crossing can be performed, a second colored light for indicating that the at least one crossing cannot be performed, or a combination thereof.

6. A method of claim 1, wherein the (1) data and/or (2) information and/or (3) at least one signal are further based, at least in part, on the following:

at least one determination of the at least one first vehicle, the at least one second vehicle, or a combination thereof based, at least in part, on at least one pointing direction of the at least one third device.

7. A method of claim 1, wherein the (1) data and/or (2) information and/or (3) at least one signal are further based, at least in part, on the following:

at least one determination of at least one intended path for performing the at least one crossing based, at least in part, on at least one pointing direction of the at least one third device.

8. A method of claim 7, wherein the (1) data and/or (2) information and/or (3) at least one signal are further based, at least in part, on the following:

at least one determination of the at least one first vehicle, the at least one second vehicle, or a combination thereof based, at least in part, on the at least one intended path.

9. A method of claim 1, wherein the (1) data and/or (2) information and/or (3) at least one signal are further based, at least in part, on the following:

a transmission of at least one first message indicating a request to synchronize the at least one movement, the at least one stop, or a combination thereof from the at least one first device to that at least one second device; and at least one determination of a response to the at least one first message from the at least one second device, wherein the synchronization is based, at least in part, on the response.

10. An apparatus comprising:

at least one processor; and at least one memory including computer program code for one or more programs, the at least one memory and the computer program code configured to, with the at least one processor, cause the apparatus to perform at least the following, determine at least one intention to perform at least one crossing of at least one object within proximity of at least one first vehicle;

determine at least one second vehicle within proximity of the at least one crossing, the at least one first vehicle, or a combination thereof; and cause, at least in part, a signaling among at least one first device associated with the at least one first vehicle and at least one second device associated with the at least one second vehicle, wherein the signaling causes, at least in part, a synchronization of at least one movement, at least one stop, the at least one intention to perform the at least one crossing, or a combination thereof among the at least one first vehicle, the at least one second vehicle, at least one cloud service, or a combination thereof in response to the at least one intention; and determine the at least one intention to perform the at least one crossing based, at least in part, on a signaling from at least one third device associated with at least one object, a detection of the at least one object, or a combination thereof.

11. An apparatus of claim 10, wherein the apparatus is further caused to:

cause, at least in part, a presentation of at least one indicator to the at least one object, wherein at least one indicator signals to the at least one object that the at least one crossing can or cannot be performed based, at least in part, on the synchronization of at least one movement, the at least one stop, or a combination thereof.

12. An apparatus of claim 11, wherein the at least one indicator includes, at least in part, at least one crossing symbol projected by the at least one first vehicle, the at least one second vehicle, or a combination thereof.

13. An apparatus of claim 12, wherein at least one crossing symbol is projected on to at least one crossing path to be used for that at least one crossing.

14. An apparatus of claim 11, wherein the at least one indicator includes, at least in part, a first colored light for indicating that the at least one crossing can be performed, a second colored light for indicating that the at least one crossing cannot be performed, or a combination thereof.

15. An apparatus of claim 10, wherein the apparatus is further caused to:

determine the at least one first vehicle, the at least one second vehicle, or a combination thereof based, at least in part, on at least one pointing direction of the at least one third device.

16. An apparatus of claim 10, wherein the apparatus is further caused to:

determine at least one intended path for performing the at least one crossing based, at least in part, on at least one pointing direction of the at least one third device.

17. An apparatus of claim 16, wherein the apparatus is further caused to:
  determine the at least one first vehicle, the at least one second vehicle, or a combination thereof based, at least in part, on the at least one intended path.

18. An apparatus of claim 10, wherein the signaling comprises:
  causing, at least in part, a transmission of at least one first message indicating a request to synchronize the at least one movement, the at least one stop, or a combination thereof from the at least one first device to that at least one second device; and
  determining a response to the at least one first message from the at least one second device,
  wherein the synchronization is based, at least in part, on the response.

* * * * *